United States Patent
Altheimer et al.

(10) Patent No.: US 7,334,893 B2
(45) Date of Patent: Feb. 26, 2008

(54) SERIES OF PROGRESSIVE OPHTHALMIC LENSES WITH LOW DIVERGENCE AND ROTATION OF ASTIGMATISM

(75) Inventors: Helmut Altheimer, Baisweil-Lauchdorf (DE); Gregor Esser, Munich (DE); Wolfgang Becken, Munich (DE); Walter Haimerl, Munich (DE); Andrea Welk, Munich (DE); Edda Wehner, Emmering (DE)

(73) Assignee: Rodenstock GmbH, Munich (DE)

( * ) Notice: Subject to any disclaimer, the term of this patent is extended or adjusted under 35 U.S.C. 154(b) by 126 days.

(21) Appl. No.: 10/573,791

(22) PCT Filed: Aug. 23, 2004

(86) PCT No.: PCT/EP2004/009400

§ 371 (c)(1),
(2), (4) Date: Mar. 28, 2006

(87) PCT Pub. No.: WO2005/036238

PCT Pub. Date: Apr. 21, 2005

(65) Prior Publication Data

US 2007/0035696 A1 Feb. 15, 2007

(30) Foreign Application Priority Data

Sep. 29, 2003 (DE) .................. 103 45 214

(51) Int. Cl.
*G02C 7/06* (2006.01)
(52) U.S. Cl. ........................ 351/169; 351/177
(58) Field of Classification Search ........... 351/161, 351/164, 168, 169, 177

See application file for complete search history.

(56) References Cited

U.S. PATENT DOCUMENTS

| 5,488,442 | A | 1/1996 | Harsigny et al. |
| 5,715,032 | A | 2/1998 | Isenberg |
| 5,726,734 | A | 3/1998 | Winthrop |
| 6,595,637 | B2 | 7/2003 | Ahsbahs et al. |

FOREIGN PATENT DOCUMENTS

| DE | 699 04 423 T2 | 4/2003 |
| EP | 0 996 023 A2 | 4/2000 |

OTHER PUBLICATIONS

International Search Report dated Jan. 26, 2005 with English Translation of relevant portion and PCT/ISA/237 (Thirteen (13) pages).

*Primary Examiner*—Scott J. Sugarman
*Assistant Examiner*—Darryl J. Collins
(74) *Attorney, Agent, or Firm*—Crowell & Moring LLP

(57) ABSTRACT

An ophthalmic lens and a method for producing a progressive ophthalmic lens having at least one progressive surface, where by a calculation and optimization step in the production of the progressive lens is performed. The absolute value of the rotation $|\text{rot } \vec{A}|$ and/or the divergence $|\text{div } \vec{A}|$ of a vectorial astigmatism $\vec{A}$ is as small as possible, and the absolute value $|\vec{A}|$ of the vectorial astigmatism $\vec{A}$ is proportional to the absolute value of an astigmatism in the use position of the progressive lens. The direction of the vectorial astigmatism $\vec{A}$ is proportional to the axial position of an astigmatism in the use position of the progressive lens or a surface astigmatism of the at least one progressive surface of the progressive lens.

32 Claims, 30 Drawing Sheets

US 7,334,893 B2

SERIES OF PROGRESSIVE OPHTHALMIC LENSES WITH LOW DIVERGENCE AND ROTATION OF ASTIGMATISM

BACKGROUND AND SUMMARY OF THE INVENTION

This invention relates to a method for producing a progressive ophthalmic lens having at least one progressive surface and to a progressive lens having at least one progressive surface.

Progressive ophthalmic lenses, also known as no-line bifocal or multifocal lenses, are known in general. They have a far vision part for observing objects at great distances, a near vision part for observing objects at closer distances and a progression zone situated between the far vision part and the near vision part. In the progression zone, the effect of the lens increases continuously from the value of the far vision part to the value of the near vision part. This increasing effect of the lens is known as addition. A change in curvature of at least one surface of the lens, referred to as the progressive surface, is required to create this progressive effect of the lens. However, a surface astigmatism, which has a negative effect on the optical imaging properties, is unavoidably associated with the progressive effect; this astigmatism is typically equal to zero only along a planar or curved line (principal line) and increases laterally to this line with twice the value of the gradient of the surface refractive power according to the Minkwitz law. Consequently there is impaired vision in the form of distortion and blurring. In dynamic vision, "swimming" and "jumping" of images perceived on the retina are especially annoying and under some circumstances can have a strongly negative effect on the wear properties of the progressive lens.

DE 43 42 234 C2 describes a progressive lens having a progressive surface, where the maximum value of the gradient of the average surface refractive value of the progressive surface lies in a part of the principal line situated in the progression zone and the gradient of the cylinder and/or astigmatism of the surface has a value lower than the product obtained by multiplying the addition times a coefficient $k_{c\,max}$ of a constant value over the entire progressive surface of the lens.

An object of the present invention is to provide a progressive ophthalmic lens which has improved wearing properties. Another object is to provide a method for manufacturing an inventive progressive lens.

According to the present invention which achieves these objects, a method of manufacturing is provided for a progressive ophthalmic lens having at least one progressive surface where the lens comprises a far vision part for seeing at great distances and having a far reference point, a near vision part designed for seeing at short distances and having a near reference point, and a progression zone situated between the far vision part and the near vision part where the effect of the lens increases from the value at the far reference point to the value at the near reference point along a principal line, this increase being by a value known as addition. A calculation and optimization step of the progressive lens is performed so that the absolute value of the rotation $|\text{rot } \vec{A}|$ and/or the divergence $|\text{div } \vec{A}|$ of a vectorial astigmatism $\vec{A}$ is a small as possible, where the absolute value $|\vec{A}|$ of the vectorial astigmatism $\vec{A}$ is proportional to the absolute value of an astigmatism in the use position of the progressive lens or a surface astigmatism of the at least one progressive surface of the progressive lens, and the direction of the vectorial astigmatism $\vec{A}$ is proportional to the cylinder axis of an astigmatism in the use position of the progressive lens or a surface astigmatism of the at least one progressive surface of the progressive lens.

The far vision part is usually situated in the upper part of the lens in the use position and the near vision part is located in the lower part of the lens. The far vision part is usually designed for seeing at an infinite distance and the near vision part is designed for reading in particular. In the case of ophthalmic lenses for special applications, e.g., lenses for pilot's glasses or glasses for working at a computer monitor, the far vision part and the near vision part may be arranged differently and designed for different distances. Furthermore, there may also be multiple near vision parts and far vision parts as well as progression zones.

The progressive lens may have one progressive surface (front or back surface) or two progressive surfaces. The progressive surface may be the side of the lens facing the eyes, i.e., the back side, or the object side, i.e., the front side of the lens, but the opposing surface usually has a spherical or toric surface, which does not contribute to the surface variation of the astigmatism of the lens. In a lens having two progressive surfaces, the derivations of the vectorial astigmatism $|\text{rot } \vec{A}|$ and $|\text{div } \vec{A}|$, which are to be kept small, are formed due to the combined effect of the front surface and the back surface (i.e., the surface facing the eyes and the object surface). The value of the addition is calculated as the difference in the use values of the refractive force at the far reference point and at the near reference point.

According to this invention, a progressive lens whose properties are especially advantageous, i.e., as small as possible with respect to the spatial variations in the astigmatism including its directional information, is achievable. According to this invention, such directional variations are recognized as the cause of the change in visual impression known as the swimming or jumping that occurs with movements of the head or line of sight.

In particular, it has been recognized that the change or variation in the cylinder axis of the astigmatism is not only a secondary parameter but, on the contrary, is an important parameter. In comparison with that, lenses corresponding to the prior art have so far never been calculated taking into account the spatial variation in their surface astigmatism including its direction information.

Of the properties of the surfaces of progressive lenses, so far in the literature at most the second derivatives of the depths of camber have usually been discussed. In some cases, such as in DE 4 342 234 C2, gradients of the surfaces refractive value $\nabla D(x, y)$ or the surface astigmatism $\nabla A(x, y)$, i.e., third derivations of the depths of camber of the surface have been discussed. The aforementioned patent refers in several places to the relevance of these gradients for dynamic vision and thus for the site conditions associated with movement of the head or line of site or combinations thereof.

However, astigmatism is always interpreted here only as a two-dimensional scalar function which is usually defined as being proportional to the difference $|1/r_1 - 1/r_2|$ of the main radii of curvature. The conventional approach disregards the cylinder axis of the astigmatism and concentrates only on its absolute value or as in DE 4 342 234 C2, concentrates on the gradient of the absolute value of the surface astigmatism.

The present invention is based on the discovery that with a spatial change in a quantity which also has a cylinder axis as is the case with astigmatism, it is not only the change in the absolute amount that is of interest but also the change in its directional information. However, any information regarding the change in cylinder axis of the astigmatism which is critical for the optical correction is lost when the vector field of the astigmatism is reduced to its absolute value.

The role played by the cylinder axis of astigmatism can be illustrated on the basis of a determination of the refraction, for example. The determination of the cylinder axis of the astigmatism is performed here in sequence before the determination of the absolute value of the astigmatism. The reason for this is that in a determination of the cylinder axis, e.g., by the cross-cylinder method, a cylinder whose absolute value is estimated is modified with regard to its cylinder axis with the help of the cross-cylinder until it has been defined optimally. This is followed by a final determination of the absolute value of the cylinder. An attempt to determine the absolute value of the cylinder even before defining the axis would result in skewed cylinders in the course of the determination of absolute value. This means that a resulting cylinder whose absolute value depends on the size of the correction cylinder and the size of the axial error would be obtained. One would thus have two constantly changing parameters which would have to be repeatedly corrected again in alternation. However, if the cylinder axis of the astigmatism is already known, then the correction cylinder is always changed by the full amount, keeping the cross cylinder in reserve. Finally, if the axis of the correction cylinder has been determined correctly, it coincides with that of the refraction deficit and the resulting cylindrical effect will be zero, as described, for example, in H. Diepes, Refraktionsbestimmung [Determining Refraction], Verlag Heinz Postenrieder, Pforzheim (1972), page 322.

In addition to having a negative effect on vision, any astigmatism also results in distortion, as already indicated above. The subjective perception of the resulting distortion of the retinal images also depends on the direction of the cylinder axis as described, for example, by J. Reiner in Auge und Brille [Eye and Lens], 4$^{th}$ edition, Ferdinand Enke Verlag Stuttgart (1987), page 27. In the case of an astigmatism according to the rule or against the rule, the result is distortion, which does not usually cause much interference for the wearer of the lens, because the distortion is only in the vertical or horizontal direction. Distortion of this type is often caused by viewing from a lateral position so it is not unknown. Problems occur for the users of ophthalmic lenses mainly in astigmatism with an oblique cylinder axis because the image of vertical and horizontal object elements on the retina is skewed. Distortion of this type is much less tolerable because vertical and horizontal lines no longer appear at right angles in space but instead form angles deviating from 90° (greater than or smaller than 90°). This results in fusion problems, which make it difficult to become adjusted to lenses. According to this invention, it has been found that such stresses are to be expected for sensory fusion when the cylinder axis of the astigmatism changes in the course of lateral eye movements. If astigmatic effects occur, which remain the same in terms of absolute value but now have an oblique cylinder axis which also changes depending on the point of viewing through the lens, this can result in intolerance of the lens in the peripheral area.

To be able to be describe spatial variations in astigmatism, first a suitable vectorial astigmatism is defined. The spatial distribution of this vectorial astigmatism defines a vector field accordingly. When the change in absolute value and direction (corresponding to the absolute value and the cylinder axis of the astigmatism) of this vectorial astigmatism is integrated into the calculation, i.e., optimization of a lens and in particular a progressive lens, new aspects which lead to improved imaging properties and thus improved wearing properties are yielded, as will be explained below. It is especially expedient for describing the derivations of the vectorial astigmatism $\vec{A}$ to consider its rotation and divergence, i.e., the vector operators rot $\vec{A} = \vec{\nabla} \times \vec{A}$ and div $\vec{A} = \vec{\nabla} \cdot \vec{A}$.

Although the present invention refers to both the consideration of the surface astigmatism of a progressive lens as well as astigmatism in the use position, surface astigmatism of the progressive surface is considered below as an example. Therefore, a detailed definition of a vectorial surface astigmatism is given below, and then a brief similar definition of a vectorial astigmatism in the use position is also given.

Definition of the vectorial surface astigmatism $\vec{A}$

The depth of camber of a progressive surface is given by the function $$z = f(x, y)$$

where the coordinates (x, y) are in the plane of the projection. The depth of camber is understood to refer to the distance of a point with coordinates (x, y) from the tangential plane of the surface vertex.

The first basic form $$g(x, y) = \begin{pmatrix} E & F \\ F & G \end{pmatrix} = \begin{pmatrix} 1 + f_x^2 & f_x f_y \\ f_x f_y & 1 + f_y^2 \end{pmatrix}$$

and the second basic form $$1(x, y) = \begin{pmatrix} K & L \\ L & M \end{pmatrix} = \frac{-1}{\sqrt{1 + f_x^2 + f_y^2}} \begin{pmatrix} f_{xx} & f_{xy} \\ f_{xy} & f_{yy} \end{pmatrix}$$

are needed to calculate the main curvatures, where the derivations are abbreviated by $$f_x = \partial_x f(x, y),$$
$$f_y = \partial_y f(x, y),$$
$$f_{xx} = \partial_x^2 f(x, y),$$
$$f_{yy} = \partial_y^2 f(x, y),$$
$$f_{xy} = \partial_x \partial_y f(x, y).$$

The main curvatures $k_1$ and $k_2$ and the main curvature directions are solutions to the general eigenvalue problem $$\begin{pmatrix} K & L \\ L & M \end{pmatrix}\begin{pmatrix} x_1 & x_2 \\ y_1 & y_2 \end{pmatrix} - \begin{pmatrix} E & F \\ F & G \end{pmatrix}\begin{pmatrix} x_1 & x_2 \\ y_1 & y_2 \end{pmatrix}\begin{pmatrix} k_1 & 0 \\ 0 & k_2 \end{pmatrix} = 0. \quad (1)$$

The eigenvectors $(x_1, y_1)$ and $(X_2, y_2)$ calculated in this way are the projections of the vectors in the tangential plane of the lens surface and indicate the main directions of curvature there.

To calculate the main direction of curvature, the eigenvectors $(x_1, y_1)$ and $(X_2, y_2)$ must be transformed to the system of the tangential plane after their calculation. This transformation can best be determined by formulating the entire eigenvalue problem itself in the tangential plane. This is done by bringing it to the form $$\begin{pmatrix} K & L \\ L & M \end{pmatrix}_{eff}\begin{pmatrix} u_1 & u_2 \\ v_1 & v_2 \end{pmatrix} - \begin{pmatrix} u_1 & u_2 \\ v_1 & v_2 \end{pmatrix}\begin{pmatrix} k_1 & 0 \\ 0 & k_2 \end{pmatrix} = 0. \quad (2)$$

because the eigenvectors $(u_1, v_1)$ and $(U_2, V_2)$ must lie in the tangential plane since the first basic form in this presentation is the unit matrix.

It seems simplest to multiply the original problem (1) simply from the left times $$\begin{pmatrix} E & F \\ F & G \end{pmatrix}^{-1}.$$

However, this would lead to an asymmetrical matrix $$\begin{pmatrix} K & L \\ L & M \end{pmatrix}_{eff}$$

whose eigenvectors would no longer be orthogonal because the (u, v) coordinate system would then be skewed. To retain symmetry, the first basic form g must first be transformed to a diagonal form:

$$W^T g W = g_d \Leftrightarrow g = W g_d W^T = (W g_d^{1/2})(W g_d^{1/2})^T$$

where $g_d$ is a diagonal matrix with the eigenvalues of g and W is a matrix whose columns have the eigenvectors of $g_d$. The transformation $(W g_d^{1/2})^T$ transforms a vector (x, y) to the tangential plane by way of $$\begin{pmatrix} u \\ v \end{pmatrix} = (W g_d^{1/2})^T \begin{pmatrix} x \\ y \end{pmatrix}$$

because the length of a vector in the (u, v) plane is given by $$(u \ v)\begin{pmatrix} u \\ v \end{pmatrix} = (x \ y)(W g_d^{1/2})(W g_d^{1/2})^T \begin{pmatrix} x \\ y \end{pmatrix}$$
$$= (x \ y)g\begin{pmatrix} x \\ y \end{pmatrix}.$$

With each transformation $(W g_d^{1/2})^T$ to the (u, v) plane, $(W g^{d1/2} R)^T$ is also such a transformation when $$R = \begin{pmatrix} \cos\varphi & \sin\varphi \\ -\sin\varphi & \cos\varphi \end{pmatrix}$$

is a rotation within the (u, v) plane. It is practical now to setup the rotation R in such a way that the u axis coincides with the intersection formed by the tangential plane with the horizontal plane. This can be achieved by an angle $\phi$ for which the lower left matrix element of $(W g_d^{1/2} R)^T$ disappears. As can be confirmed by calculation, this is the case for $$\varphi_0 = \arctan\frac{f_y}{f_x}\sqrt{1 + f_x^2 + f_y^2}$$

and the resulting transformation is then given by $$T = (W g_d^{1/2} R(\varphi_0))^T$$
$$= \frac{\text{Sign}(f_x)}{\sqrt{(1 + f_y^2)(1 + f_x^2 + f_y^2)}}\begin{pmatrix} (1 + f_y^2) & 0 \\ -f_x f_y & \sqrt{1 + f_x^2 + f_y^2} \end{pmatrix}$$

and $$T^{-1} = \frac{\text{Sign}(f_x)}{\sqrt{1 + f_y^2}}\begin{pmatrix} \sqrt{1 + f_x^2 + f_y^2} & 0 \\ f_x f_y & 1 + f_y^2 \end{pmatrix}$$

The eigenvalue problem can now be written by inserting $g = T^T T$ in the form:

$$\begin{pmatrix} K & L \\ L & M \end{pmatrix}\begin{pmatrix} x_1 & x_2 \\ y_1 & y_2 \end{pmatrix} - T^T T\begin{pmatrix} x_1 & x_2 \\ y_1 & y_2 \end{pmatrix}\begin{pmatrix} k_1 & 0 \\ 0 & k_2 \end{pmatrix} = 0 \Leftrightarrow$$

$$(T^{-1})^T\begin{pmatrix} K & L \\ L & M \end{pmatrix}T^{-1}T\begin{pmatrix} x_1 & x_2 \\ y_1 & y_2 \end{pmatrix} - T\begin{pmatrix} x_1 & x_2 \\ y_1 & y_2 \end{pmatrix}\begin{pmatrix} k_1 & 0 \\ 0 & k_2 \end{pmatrix} = 0 \Leftrightarrow$$

$$\begin{pmatrix} K & L \\ L & M \end{pmatrix}_{eff}\begin{pmatrix} u_1 & u_2 \\ v_1 & v_2 \end{pmatrix} - \begin{pmatrix} u_1 & u_2 \\ v_1 & v_2 \end{pmatrix}\begin{pmatrix} k_1 & 0 \\ 0 & k_2 \end{pmatrix} = 0.$$

The eigenvalue problem transformed in this way to the tangential plane contains a symmetrical representation of the second basic form:

$$\begin{pmatrix} K & L \\ L & M \end{pmatrix}_{eff} = (T^{-1})^T\begin{pmatrix} K & L \\ L & M \end{pmatrix}T^{-1}$$
$$= \frac{1}{(1 + f_y^2)\sqrt{1 + f_x^2 + f_y^2}}$$

-continued $$\begin{pmatrix} \dfrac{-f_x(1+f_y^2)+f_xf_y(-f_xf_y^2+2f_{xy}(1+f_y^2))}{1+f_x^2+f_y^2} & \dfrac{f_xf_y^2-f_{xy}(1+f_y^2)}{\sqrt{1+f_x^2+f_y^2}} \\ \dfrac{f_xf_y^2-f_{xy}(1+f_y^2)}{\sqrt{1+f_x^2+f_y^2}} & -f_y \end{pmatrix}$$

and thus yields the main curvatures $k_1$ and $k_2$ and the respective main directions of curvature $(u_1, v_1)$ and $(U_2, v_2)$.

For definition of a vectorial astigmatism, i.e., a vector field for the astigmatism, the absolute value of which is given by the quantity $|k_1-k_2|$, it is advantageous to double the angle; this is usually also done to check the cylinder axis of the TABO scheme in polar coordinates as proposed, for example, in WO 01/81979. If the direction of the first cylinder axis is given approximately by the angle $\psi$=arctan $v_1/u_1$, then a vectorial astigmatism can be defined as follows:

$$\vec{A} = (n-1)|k_2 \cdot k_1| \begin{pmatrix} \cos 2\psi \\ \sin 2\psi \end{pmatrix} \qquad (3)$$

$$= \dfrac{n-1}{(1+f_y^2)(1+f_x^2+f_y^2)^{3/2}}$$

$$\begin{pmatrix} -2f_xf_{xy}f_y(1+f_y^2)+f_{xx}(1+f_y^2)^2 + \\ f_x^2(-1+f_y^2)f_{yy} - (1+f_y^2)f_{yy}, \\ 2\sqrt{1+f_x^2+f_y^2}\,(f_{xy}+f_{xy}f_y^2-f_xf_yf_{yy}) \end{pmatrix},$$

where n is the refractive index.

It should be pointed out here that the second cylinder axis does not lead to a new astigmatism but instead causes only a global plus or minus sign: the second cylinder axis is perpendicular to the first and the right angle is expanded to 180° by doubling the angle.

By analogy with vectorial surface astigmatism, an astigmatism in use position is defined vectorial as $|k_2-k_1|(\cos 2\psi, \sin 2\psi)$ where $k_{1,2}$ are not the eigenvalues of the second basic form of the refractive surface, however, but instead the emergent wave front. The quantity (n−1) which depends on the refractive index is contained in the eigenvalues $k_{1,2}$—in contrast with the situation with the surface astigmatism in equation (3)—and therefore need not be multiplied as an additional factor. The angle $\psi$ is intended in the tangential plane at the wave front and has as the reference direction the line of intersection of this plane with the horizontal plane. For perpendicular incidence of a wave front from the infinite, the factor given in equation (3) is obtained for the vectorial astigmatism in the use position; otherwise deviating values are obtained.

In the following discussion, the astigmatism $\vec{A}$ is understood to be the vectorial surface astigmatism defined according to equation (3).

A first approximation of the vectorial astigmatism is obtained by assuming that the first derivatives $f_x$, $f_y$ of the depth of camber are small in comparison with 1, i.e., $$1+f_x^2 \approx 1,\ 1+f_y^2 \approx 1,$$

etc. For the vectorial astigmatism it then holds that:

$$\vec{A} = (n-1)\begin{pmatrix} f_{xx}-f_{yy} \\ 2f_{xy} \end{pmatrix} \qquad (4)$$

It follows from equation (4) that the vectorial astigmatism is an expression of the second derivatives of the depth of camber.

On the whole, this yields four independent derivatives of the vector field $\vec{A}$, namely $$\dfrac{\partial A_x}{\partial x},\ \dfrac{\partial A_x}{\partial y},\ \dfrac{\partial A_y}{\partial x}\ \text{and}\ \dfrac{\partial A_y}{\partial y}.$$

They are all of the same order of magnitude.

Although they are all of interest, the following discussion is limited to two especially customary combinations of these four derivatives of the vectorial astigmatism $\vec{A}$, namely its divergence $$\text{div}\,\vec{A} = \vec{\nabla}\cdot\vec{A} = \dfrac{\partial A_x}{\partial x} + \dfrac{\partial A_y}{\partial y} \qquad (5)$$

and the z component of its rotation $$\left(\text{rot}\,\vec{A}\right)_z = \left(\vec{\nabla}\times\vec{A}\right)_z = \dfrac{\partial A_y}{\partial x} + \dfrac{\partial A_x}{\partial y}. \qquad (6)$$

For reasons of simplicity, rot $\vec{A}$ is written below instead of (rot $\vec{A}$)$_z$ because rot $\vec{A}$=(0, 0, (rot $\vec{A}$)$_z$).

The exact formulas for rar $\vec{A}$ and div $\vec{A}$ derived from equation (3) for the vectorial astigmatism $\vec{A}$ are not given here for reasons of space but instead the exact results obtained from them are plotted graphically below. When the approximation obtained according to equation (3) for the vectorial astigmatism is inserted in equations (5) and (6), this yields the following approximations for the divergence and rotation of the vectorial astigmatism:

$$\text{div}\,\vec{A} \propto f_{xxx}+f_{xyy}\ \text{and}\ (\text{rot}\,\vec{A})_z \propto f_{yyy}+f_{xxy}. \qquad (7)$$

It can be seen from equation (7) that the rotation and divergence of the vectorial astigmatism $\vec{A}$ characterize the derivations of the depth of camber. There are a total of four independent third derivatives of the depth of camber, namely $f_{xxx}$, $f_{xxy}$, $f_{xyy}$, $f_{yyy}$.

Ophthalmic lenses manufactured by the inventive method have definitely improved wear properties in comparison with ophthalmic lenses produced by conventional methods without optimization with regard to the absolute value as well as the direction of astigmatism of the ophthalmic lens. It should be pointed out that the present application refers to the astigmatism inherent in a progressive lens which does not serve to correct the natural astigmatism of the eye (the latter is constant over the entire lens anyway and therefore has negligible derivations).

The calculation and optimization step is preferably performed in such a way that a global maximum of the absolute value $|\text{div } \vec{A}|$ of the divergence of the vectorial astigmatism $\vec{A}$ is outside of the zone of good vision of the lens, in which the absolute value of the vectorial astigmatism $|\vec{A}|$ is less than 0.6 dpt, preferably less than or equal to 0.5 dpt, and is preferably located in the peripheral area of the lens.

As a result, the interfering maximums and minimums of div $\vec{A}$ are shifted into a range which is not often used for vision purposes and therefore the wearing properties of the lens are improved. An astigmatism with a value of more than 0.5 dpt leads to an image that is perceived as blurred on the retina.

The calculation and optimization step is also preferably performed in such a way that the x coordinate of the position of the global maximum of the absolute value $|\text{div } \vec{A}|$ of the divergence of the vectorial astigmatism $\vec{A}$ is greater than 6.0 mm and the y coordinate is less than −8.5 mm, where x is the horizontal axis and y is the vertical axis in the use position, and the zero point x=0, y=0 is 4 mm below the centering point of the lens.

The horizontal axis x is therefore parallel to the direction which is defined by two permanent marks on the rimless lens which are a distance of 17 mm laterally from the principal line. The vertical axis y is perpendicular to the horizontal direction. The zero point x=0, y=0 is 4 mm below the centering point of the lens and corresponds to the center of the lens in the case of non-predecentered lenses. For most lenses this is also the prism reference point, i.e., the point at which the prismatic effect of the lens is to be determined. The centering point is 4 mm above the midpoint of the lens and is prestamped on the lens in the form of a cross. In observation of the surface astigmatism of the progressive surface, x and y are in a tangential plane passing through the vertex of the progressive surface. Within the range y≧−8 mm, there are no mentionable extremes at all of the divergence $|\text{div } \vec{A}|$ of the vectorial astigmatism $\vec{A}$. This feature is satisfied for all additions.

An extreme of div $\vec{A}$ is considered "mentionable" if its absolute value is more than (0.1/mm) times the addition.

Furthermore, the calculation and optimization step is preferably performed so that all extremes of the amount $|\text{div } \vec{A}|$ of the divergence of the vectorial astigmatism $\vec{A}$ exceeding the value of (0.1/mm) times the addition are outside the range y≧−9 mm of the lens for all progressive surfaces with addition ≧2.0 dpt. This feature is satisfied for all basic curves.

In addition, it is also preferable if the calculation and optimization step is performed so that the absolute value $|\text{rot } \vec{A}|$ of the rotation of the vectorial astigmatism $\vec{A}$ in the near vision part and/or in the far part does not increase beyond a maximum value of $|\text{rot } \vec{A}|_{max} \approx 0.25$ addition/dpt·dpt/mm.

The calculation and optimization step is especially preferably performed so that the absolute value $|\text{rot } \vec{A}|$ of the rotation of the vectorial astigmatism $\vec{A}$ in the horizontal section at y=−14 mm does not exceed a maximum value of $|\text{rot } \vec{A}|_{max} \approx 0.115$ addition/dpt*dpt/mm, preferably $|\text{rot } \vec{A}|_{max} \approx 0.08$ addition/dpt*dpt/mm.

Furthermore, the calculation and optimization step is preferably performed so that the absolute value $|\text{rot } \vec{A}|$ of the rotation of the vectorial astigmatism $\vec{A}$ in the horizontal section at y=+6 mm does not exceed a maximum value of $|\text{rot } \vec{A}|_{max} \approx 0.115$ addition/dpt*dpt/mm, preferably $|\text{rot } \vec{A}|_{max} \approx 0.06$ addition/dpt*dpt/mm.

The calculation and optimization step is preferably performed so that in the far vision part between y=3 mm and y=5 mm there is at least one horizontal section y=const along which the value $|\text{rot } \vec{A}|$ of the rotation of the vectorial astigmatism $\vec{A}$ increases monotonically from the principal line outward to a coordinate of |x|=16 mm.

Furthermore, it is preferable for the calculation and optimization step to be performed so that the divergence div $\vec{A}$ of the vectorial astigmatism $\vec{A}$ in the horizontal section at y=0 mm does not increase beyond a maximum value of (div $\vec{A})_{max} \approx (0.11$ addition/dpt+0.03) dpt/mm, preferably (div $\vec{A})_{max} \approx (0.08$ addition/dpt+0.03) dpt/mm.

The calculation and optimization step is preferably performed so that the divergence div $\vec{A}$ of the vectorial astigmatism $\vec{A}$ in the horizontal section at y=0 mm does not fall below a minimum value of (div $\vec{A})_{min} \approx (−0.07$ addition/dpt−0.11) dpt/mm, preferably (div $\vec{A})_{min} \approx (−0.05$ addition/dpt−0.08) dpt/mm.

A method for manufacturing a progressive lens that is currently especially preferred is one in which the calculation and optimization step is performed so that the divergence div $\vec{A}$ of the vectorial astigmatism $\vec{A}$ in the horizontal section at y=−14 mm does not increase beyond a maximum value of (div $\vec{A})_{max} \approx (0.12$ addition/dpt+0.06) dpt/mm.

In addition it is preferable if the calculation and optimization step is performed so that the divergence div $\vec{A}$ of the vectorial astigmatism $\vec{A}$ in the horizontal section at y=−14 mm does not drop below a minimum value of (div $\vec{A})_{min} \approx (−0.13$ addition/dpt−0.05) dpt/mm. Furthermore, according to this invention, a progressive lens having at least one progressive surface is provided, whereby the lens has at least:

- one far vision part designed for seeing at great distances and having a far reference point;
- one near vision part designed for seeing at short distances and having a near reference point;
- progression zone situated between the far and near vision parts where the effect of the lens increases along a principal line by a value (referred to as "addition" or "add power") from the value at the far reference point to the value at the near reference point the global maximum of the absolute value $|\text{div } \vec{A}|$ of the divergence of a vectorial astigmatism $\vec{A}$ is situated outside of the zone of good vision of the lens in which the absolute value of vectorial astigmatism $|\vec{A}|$ is less than 0.6 dpt, preferably less than or equal to 0.5 dpt and is preferably situated in the peripheral area of the lens; and/or the absolute value $|\text{rot } \vec{A}|$ of the rotation of the vectorial astigmatism $\vec{A}$ in the near vision part and/or in the far vision part does not exceed a maximum value of $|\text{rot } \vec{A}|_{max} \approx 0.25$ addition/dpt·dpt/mm, and further the absolute value $|\vec{A}|$ of the vectorial astigmatism $\vec{A}$ is proportional to the absolute value of an astigmatism in the use position of the progressive lens or a surface astigmatism of the at least one progressive surface of the progressive lens, and the direction of the vectorial astigmatism $\vec{A}$ is proportional to the cylinder axis of an astigmatism in the use position of the progressive lens or a surface astigmatism of the at least one progressive surface of the progressive lens.

The x coordinate of the position of the global maximum of the absolute value $|\text{div } \vec{A}|$ of the divergence of the vectorial astigmatism $\vec{A}$ is preferably greater than 6.0 mm and the y coordinate is preferably less than −8.5 mm, where x denotes the horizontal axis and y denotes the vertical axis in the use position, and the zero point x=0, y=0 is situated 4 mm beneath the centering point of the lens.

For all progressive surfaces with addition $\geq 2.0$ dpt, it is also preferable for all extremes of the absolute value $|\text{div } \vec{A}|$ of the divergence of the vectorial astigmatism $\vec{A}$ exceeding the value (0.1/mm) times the addition to be outside of the range $y \geq -9$ mm of the lens.

The absolute value $|\text{rot } \vec{A}|$ of the vectorial astigmatism $\vec{A}$ in the horizontal section at y=−14 mm especially preferably does not increase beyond a maximum value of $|\text{rot } \vec{A}|_{max} \approx 0.115$ addition/dtp·dpt/mm, preferably $|\text{rot } \vec{A}|_{max} \approx 0.08$ addition/dpt·dpt/mm.

The absolute value $|\text{rot } \vec{A}|$ of the rotation of the vectorial astigmatism $\vec{A}$ in the horizontal section at y=+6 mm preferably does not increase beyond a maximum value of $|\text{rot } \vec{A}|_{max} \approx 0.115$ addition/dpt·dpt/mm, preferably $|\text{rot } \vec{A}|_{max} \approx 0.06$ addition/dpt·dpt/mm.

It is also preferable if, in the far vision part between y=3 mm and y=5 mm, there is at least one horizontal section y=const along which the absolute value $|\text{rot } \vec{A}|$ of the rotation of the vectorial astigmatism $\vec{A}$ increases monotonically from the principal line outward to a coordinate of $|x|=16$ mm.

It is also preferable if the divergence div $\vec{A}$ of the vectorial astigmatism $\vec{A}$ in the horizontal section at y=0 mm does not exceed a maximum value of $(\text{div } \vec{A})_{max} \approx (0.11$ addition/dpt+0.03) dpt/mm, preferably $(\text{div } \vec{A})_{max} \approx (0.08$ addition/dpt+0.03) dpt/mm.

The divergence div $\vec{A}$ of the vectorial astigmatism $\vec{A}$ in the horizontal section at y=0 mm preferably does not drop below a minimum value of $(\text{div } \vec{A})_{min} \approx (-0.07$ addition/dpt−0.11) dpt/mm, preferably $(\text{div } \vec{A})_{min} \approx (-0.05$ addition/dpt−0.08) dpt/mm.

It is also preferable if the divergence div $\vec{A}$ of the vectorial astigmatism $\vec{A}$ in the horizontal section at y=−14 mm does not exceed a maximum value of $(\text{div } \vec{A})_{max} \approx (0.12$ addition/dpt +0.06) dpt/mm.

It is especially preferable if the divergence div $\vec{A}$ of the vectorial astigmatism $\vec{A}$ in the horizontal section at y=−14 mm does not drop below a minimum value of $(\text{div } \vec{A})_{min} \approx (-0.13$ addition/dpt−0.05) dpt/mm.

DETAILED DESCRIPTION OF THE DRAWINGS

Figure 1A:
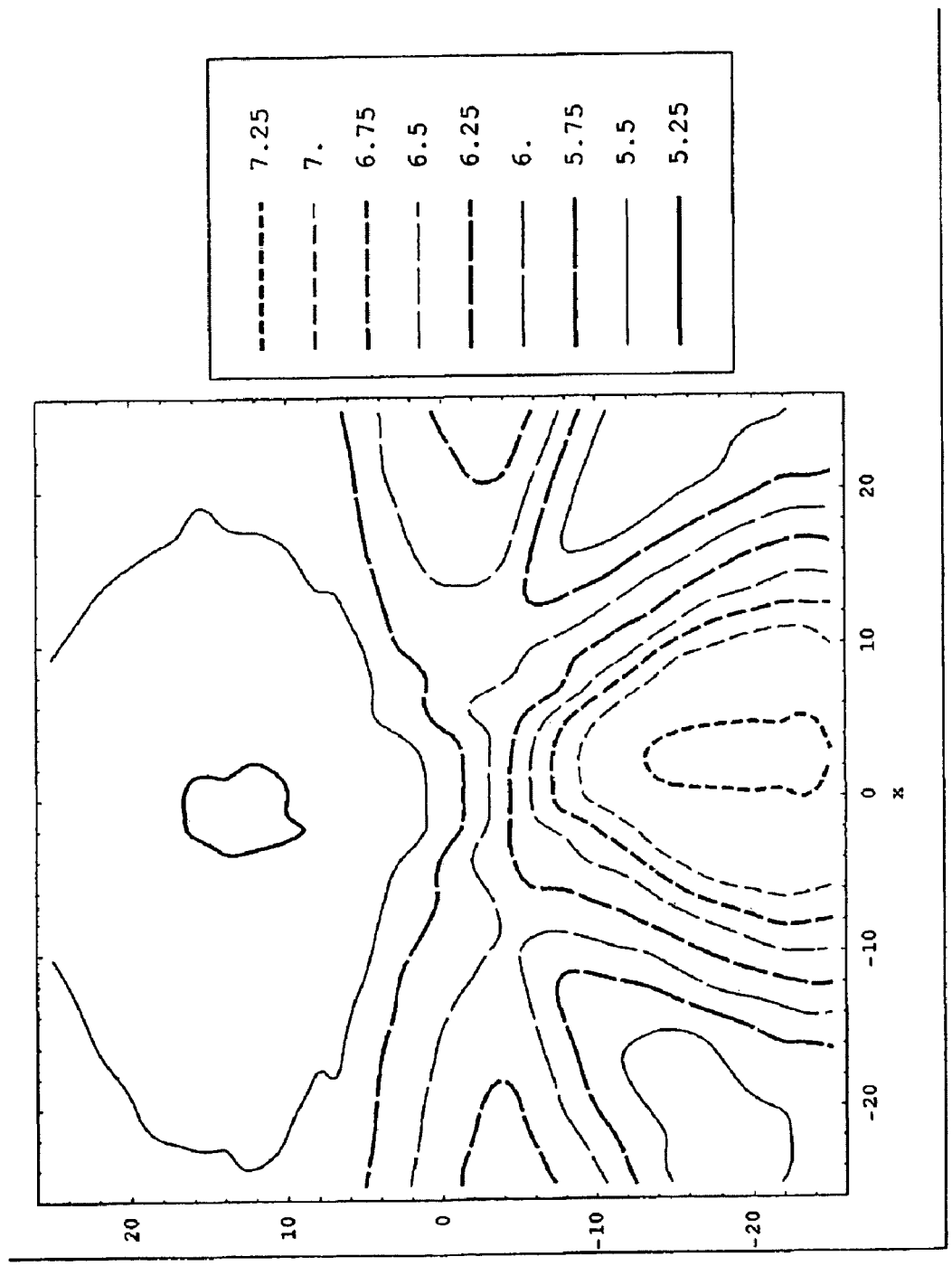
FIG. 1 is a plot of the surface refractive value of the front surface of a lens according to the prior art in dpt as a function of the coordinates (x, y) in mm.
FIG. 1B is a plot of the surface refractive value of the front surface of a lens according to exemplary embodiment 1 in dpt as a function of the coordinates (x, y) in mm.
FIG. 1C is a plot of the surface refractive value of the front surface of a lens according to exemplary embodiment 2 in dpt as a function of the coordinates (x, y)in mm.

The features of this invention are explained in greater detail below on the basis of two exemplary embodiments (exemplary embodiment 1 and exemplary embodiment 2). Furthermore, a comparison is made with a traditional or prior art ophthalmic lens.

All comparable lenses (the lenses of the two exemplary embodiments and the prior art) have a spheric/toric back surface (ocular surface) and a progressive front surface (object surface). In this case, the rotational and divergence properties of the astigmatism can be explained on the basis of the properties of the front surface alone. The progressive surface of the lenses according to the two inventive embodiments each have a basic curve of 4 dpt and addition of 2 dpt, where the addition value always indicates the difference between the utilitarian values of the refractive power at the far reference point $B_F$ and at the near reference point $B_N$.

For all figures the choice of coordinates is such that the zero point (x, y)=(0, 0) is located 4 mm below the centering point $B_z$, where x is the horizontal direction and y is the vertical direction in the use position, as is usually the case. In addition, the surface astigmatism as referred to below is to be understood as being a vectorial surface astigmatism as defined in equation (3).

The illustrations according to the prior art are always labeled as FIG. A, while those according to exemplary embodiment 1 are labeled as FIG. B and those according to exemplary embodiment 2 are labeled as FIG. C. The corresponding depths of camber in mm as a function of the coordinates (x, y) in mm of exemplary embodiment 1 and exemplary embodiment 2 according to this invention are also disclosed in Tables 3A and 3B. Table 3A gives the depth of camber for the progressive surface in mm according to exemplary embodiment 1 and Table 3B gives the depth of camber for the progressive lens according to exemplary embodiment 2 of the present invention.

In this situation, a lens is completely characterized only when the back surface properties and other parameters (given in Table 1) have also been specified in addition to the front surface properties. Table 1 shows a complete characterization of the inventive lenses of exemplary embodiment 1 and 2 as well as those according to the state of the art. In the present case, the formula gives a cylinder value of zero, so the back surfaces of the lenses have a cylinder value of zero. Therefore only their surface refractive value is given. The front surfaces are adjusted according to basic curves. The fact that the front surface of the prior art lens has a greater basic curve than do the lenses according to this invention (5.7 dpt instead of 4.0 dpt) is due to the shallower deflection of the lenses according to this invention. However, this difference has no effect on the distribution of the front surface of astigmatism and thus on the comparability of this invention with the prior. It is essential for comparability that the invention and the prior belong to the same prescription, i.e., have the same prescription values.

TABLE 1

| Property | State of the art (Progressive Life 1) | Invention (Ex 1) | Invention (Ex 2) |
|---|---|---|---|
| Surfaces | 5.7 | 4.0 | 4.0 |
| Basic curve | | | |
| Surface refractive value Front surface (dpt) in $B_F$ | 6.5 | 4.5 | 4.5 |
| Surface refractive value Back surface (dpt) | −5.82 | −4.05 | −4.10 |
| Prescription data | | | |
| Sphere (dpt) | 0.5 | 0.5 | 0.5 |
| Cylinder (dpt) | 0.0 | 0.0 | 0.0 |
| Axis (deg) | 0.0 | 0.0 | 0.0 |
| Addition (dpt) | 2.0 | 2.0 | 2.0 |
| Prism (cm/m) | 0.0 | 0.0 | 0.0 |
| Centering | | | |
| Interpupillary distance (mm) | 63.0 | 64.0 | 64.0 |
| Corneal vertex distance (mm) | 15.0 | 13.0 | 13.0 |
| Anterior tilt (deg) | 8.0 | 7.0 | 7.0 |
| Ocular pivot point distance (mm) | 28.5 | 26.5 | 26.5 |
| Stamp points | | | |
| Far reference point (x, y) | (0.0, 8.0) | (0.0, 8.0) | (0.0, 8.0) |
| Centering point (x, y) | (0.0, 4.0) | (0.0, 4.0) | (0.0, 4.0) |
| Near reference point (x, y) | (−2.5, −14.0) | (−2.5, −14.0) | (−2.5, −14.0) |
| Prism reference point (x, y) | (0.0, 0.0) | (0.0, 0.0) | (0.0, 0.0) |
| Material | | | |
| Name | Perfalit 1.5 | Perfalit 1.6 | Perfalit |
| Refractive index n | 1.502 | 1.597 | 1.502 |
| Lens data | | | |
| Center thickness d (mm) | 4.7 | 2.34 | 2.6 |
| Diameter (mm) | 80.0 | 65.0 | 65.0 |
| Thickness reduction prism (cm/m) | 0.0 | 1.0 | 0.0 |

Figure 1B:
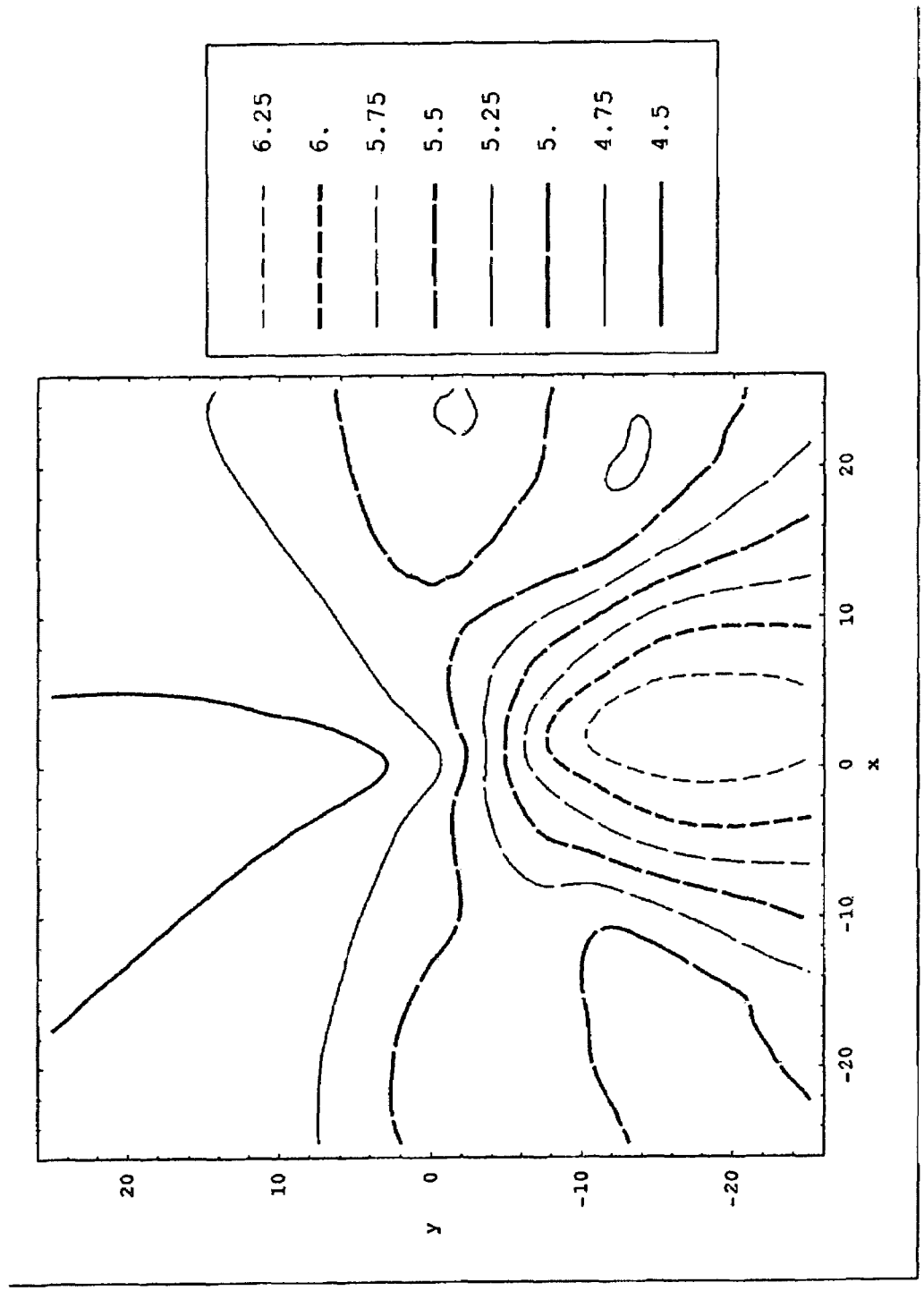
Figure 1C:
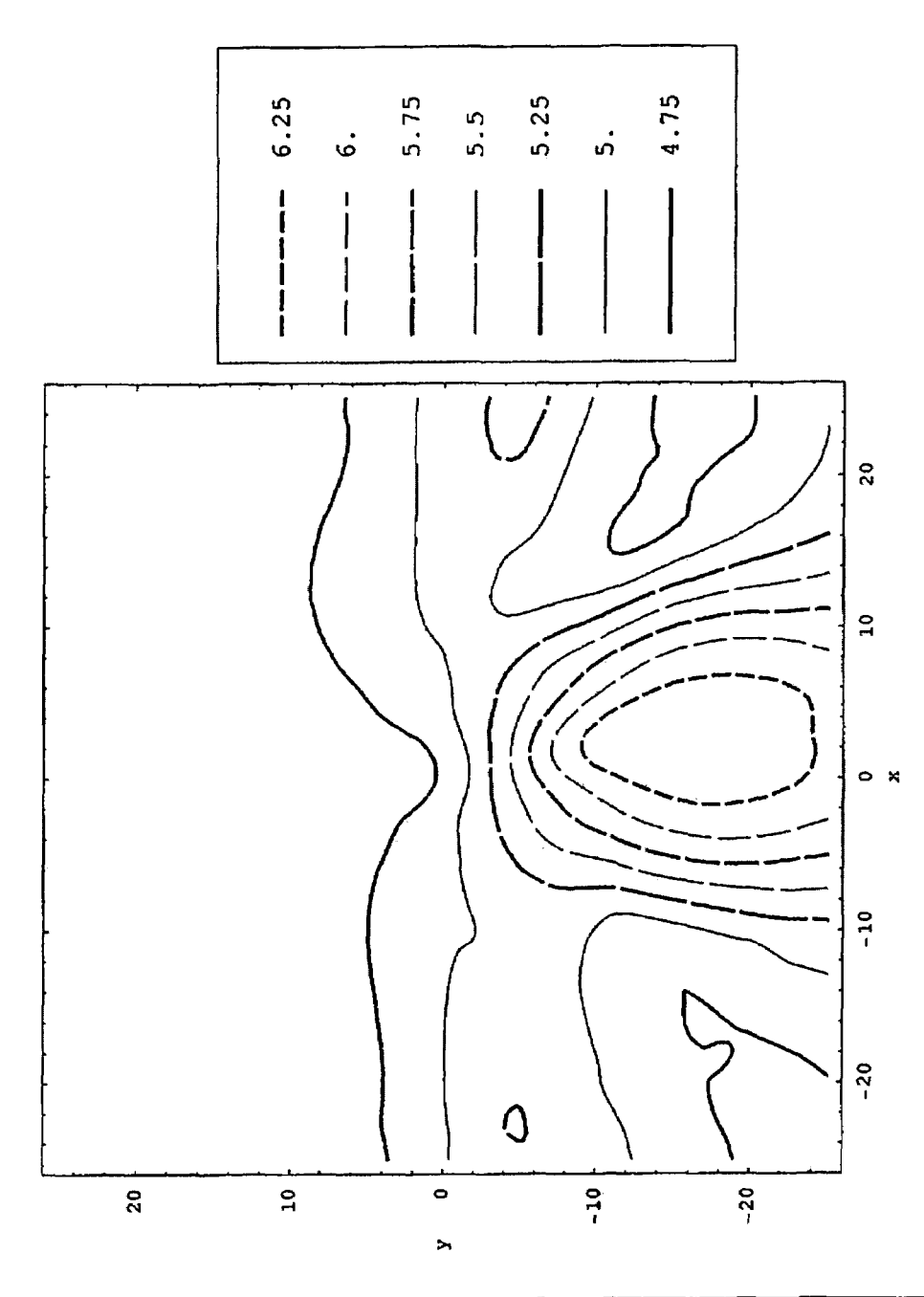

The lenses are first characterized by certain refractive value distributions which are shown in FIG. 1A for the in FIG. 1B for exemplary embodiment 1 and in FIG. 1C for exemplary embodiment 2. FIGS. 1A through 1C show the distribution of the mean surface refractive value D=(n−1)(k$_1$+k$_2$)/2 of the front surface as a function of the coordinates (x, y) in mm, where n denotes the refractive index and k$_{1,2}$ denote the main curvatures of the front surface. The distribution of the mean refractive value is depicted as isolines and/or height lines of the same value at a distance of 0.25 dpt.

As shown by FIGS. 1A through 1C, the increase in the surface refractive value from 4.5 dpt in the far vision part to 6.25 dpt in the near vision part in the lenses according to the present invention is less than in the case of the prior art lens which shows an increase from 5.25 dpt to 7.25 dpt, so the surface astigmatism of the front surface is also lower than that in the prior art. One advantage of this invention is that this, together with the spherical back surface, achieves the same addition in the use position of 2.0 dpt as in the prior art but without the astigmatism in the use position, achieving the high values as in the state of the art due to the addition and the back surface. In particular, because of the inclined ray passage, the addition of 2.0 dpt in the use position is achieved even if the increase in surface refractive value of the front surface is less than 2.0 dpt. The maximum use value of the astigmatism of the lenses according to the invention is 2.41 dpt for exemplary embodiment 1 and 2.53 dpt for exemplary embodiment 2 in comparison with 2.92 dpt in the state of the art.

Figure 2A:
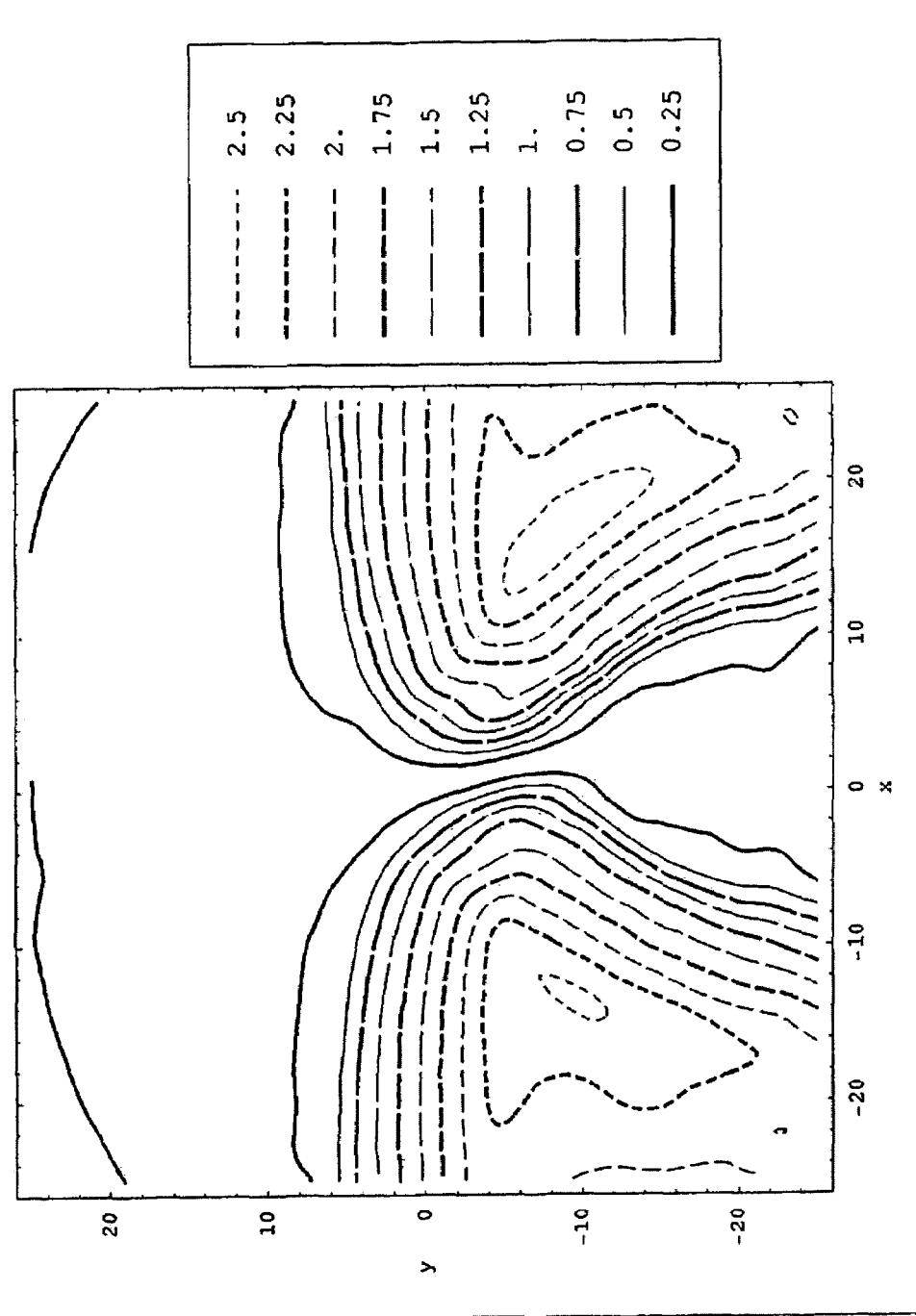
FIG. 2A is a plot of the absolute value of the surface astigmatism of the front surface of a lens according to the state of the art in dpt as a function of the coordinates (x, y) in mm.
Figure 2B:
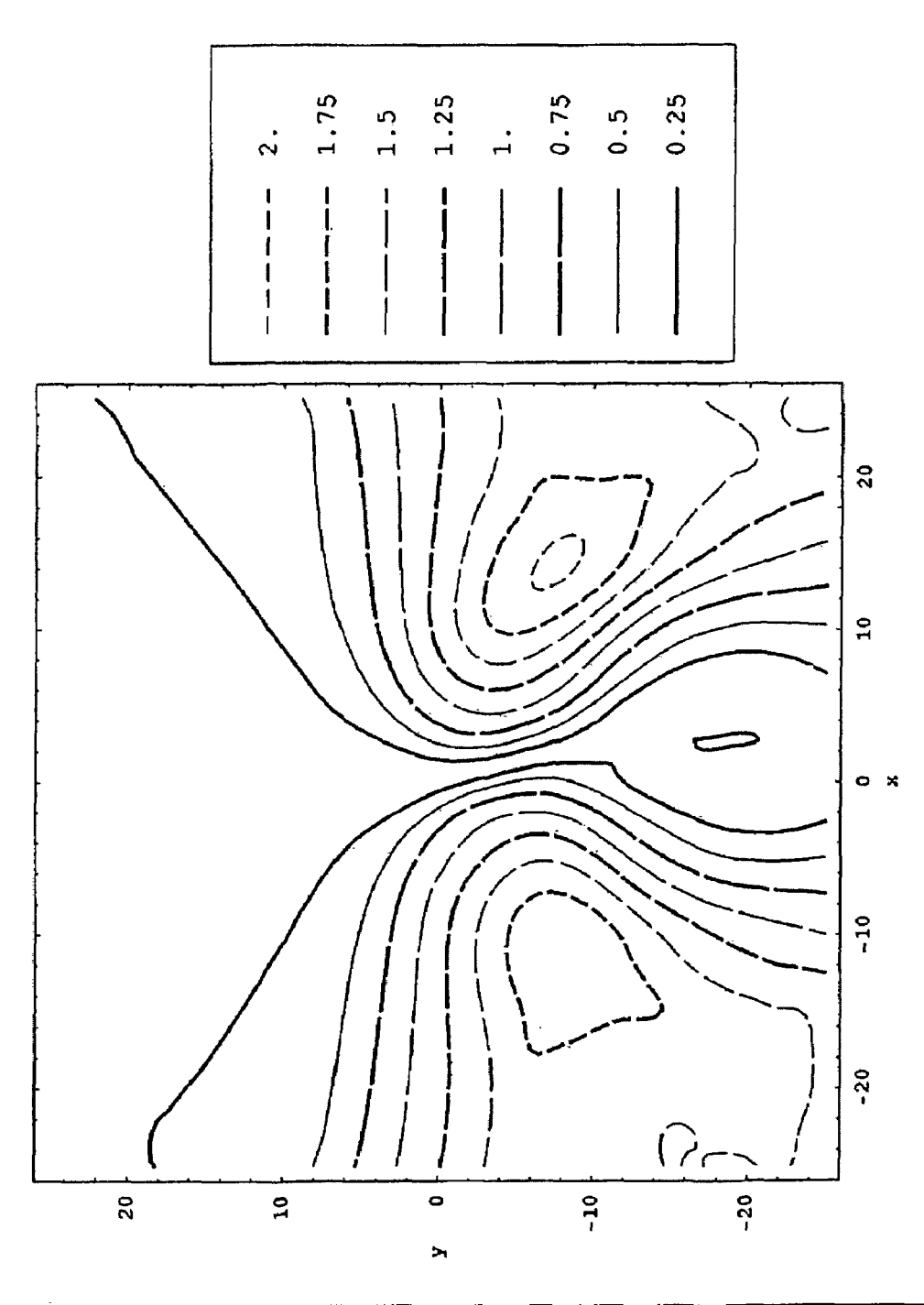
FIG. 2B is a plot of the absolute value of the surface astigmatism of the front surface of a lens according to exemplary embodiment 1 in dpt as a function of the coordinates (x, y) in mm.
Figure 2C:
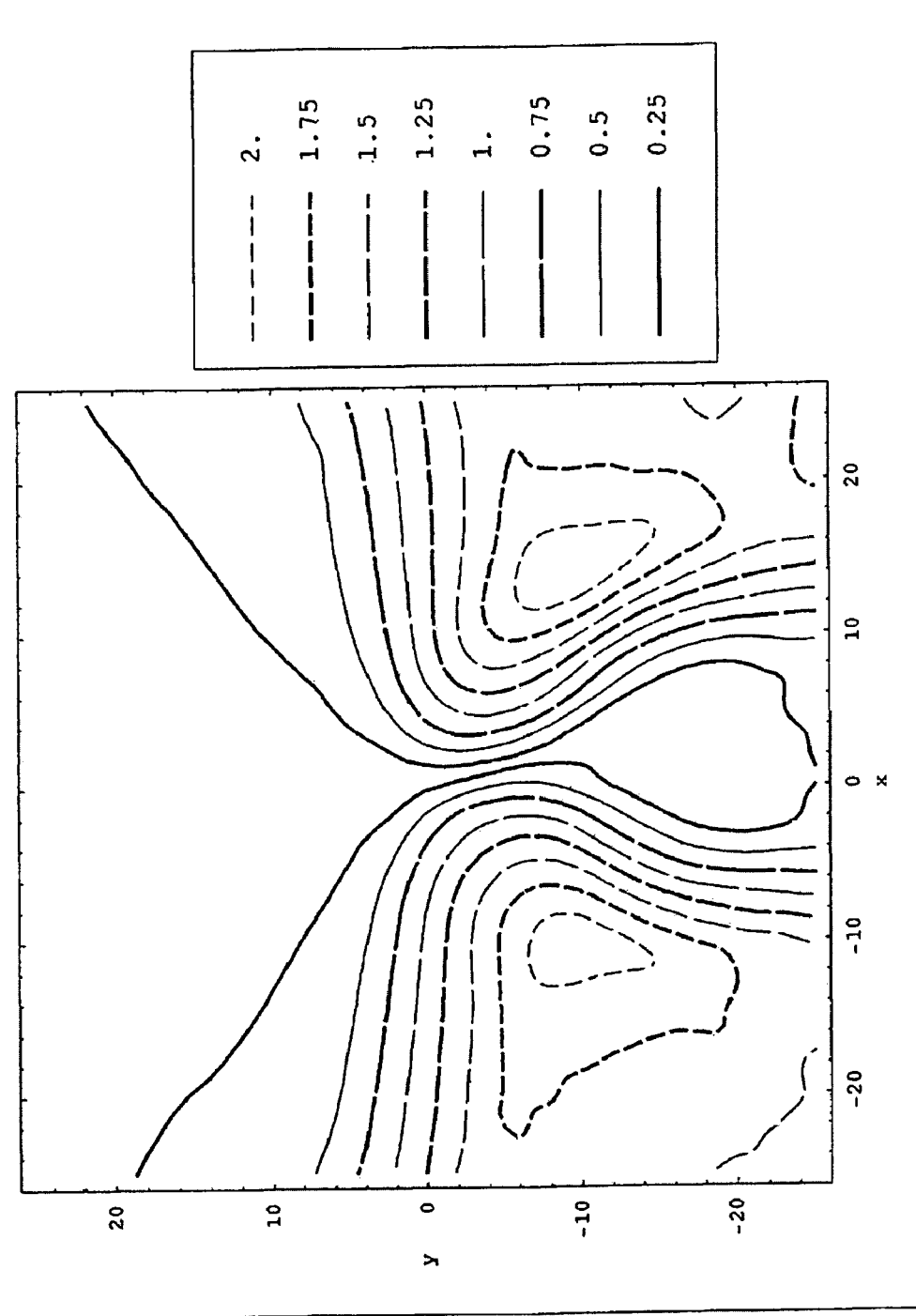
FIG. 2C is a plot of the absolute value of the surface astigmatism of the front surface of a lens according to exemplary embodiment 2 in dpt as a function of the coordinates (x, y) in mm.

FIGS. 2A through 2C show the plot of the absolute value of the astigmatism of the front surface according to equation (3) as a function of the coordinates (x, y) in mm, where FIG. 2A shows the prior art, FIG. 2B shows exemplary embodiment 1 and FIG. 2C shows exemplary embodiment 2. The course of the absolute value of the surface astigmatism is represented by isolines at a distance of 0.25 dpt. All the information that can be obtained by considering the absolute value of the astigmatism $|\vec{A}|$ can be seen from FIGS. 2A through 2C.

As FIG. 2A shows, in the prior the surface astigmatism assumes an absolute value of max 2.62 dpt according to equation (3). In comparison with that, the maximum values of the surface astigmatism amount to 2.04 dpt for exemplary embodiment 1 (FIG. 2B) and 2.16 dpt for exemplary embodiment 2 (FIG. 2C) of this invention.

Figure 3A:
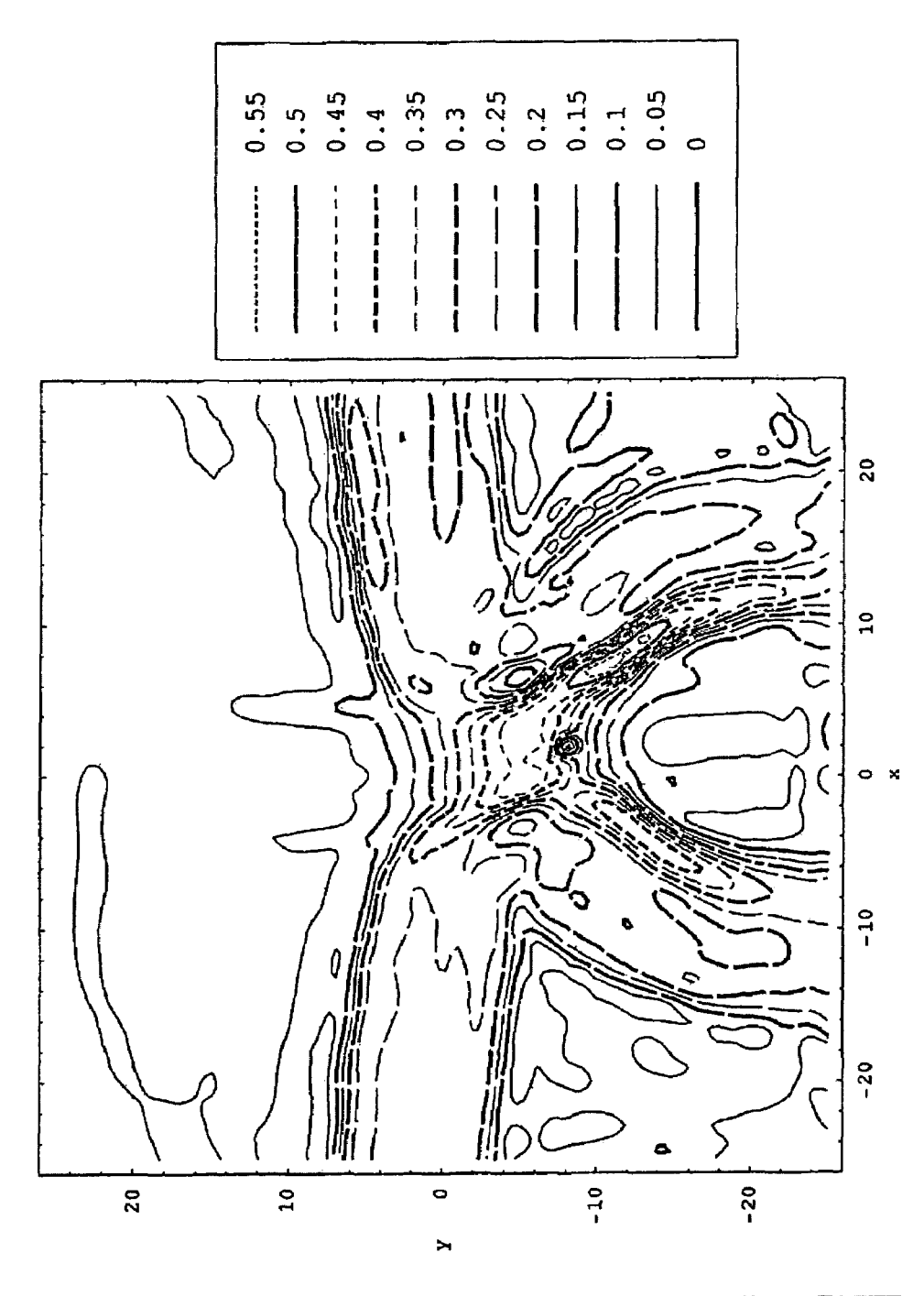
FIG. 3A is a plot of the gradient of absolute value of the surface astigmatism of the front surface of a lens according to the art in dpt as a function of the coordinates (x, y) in mm.
Figure 3B:
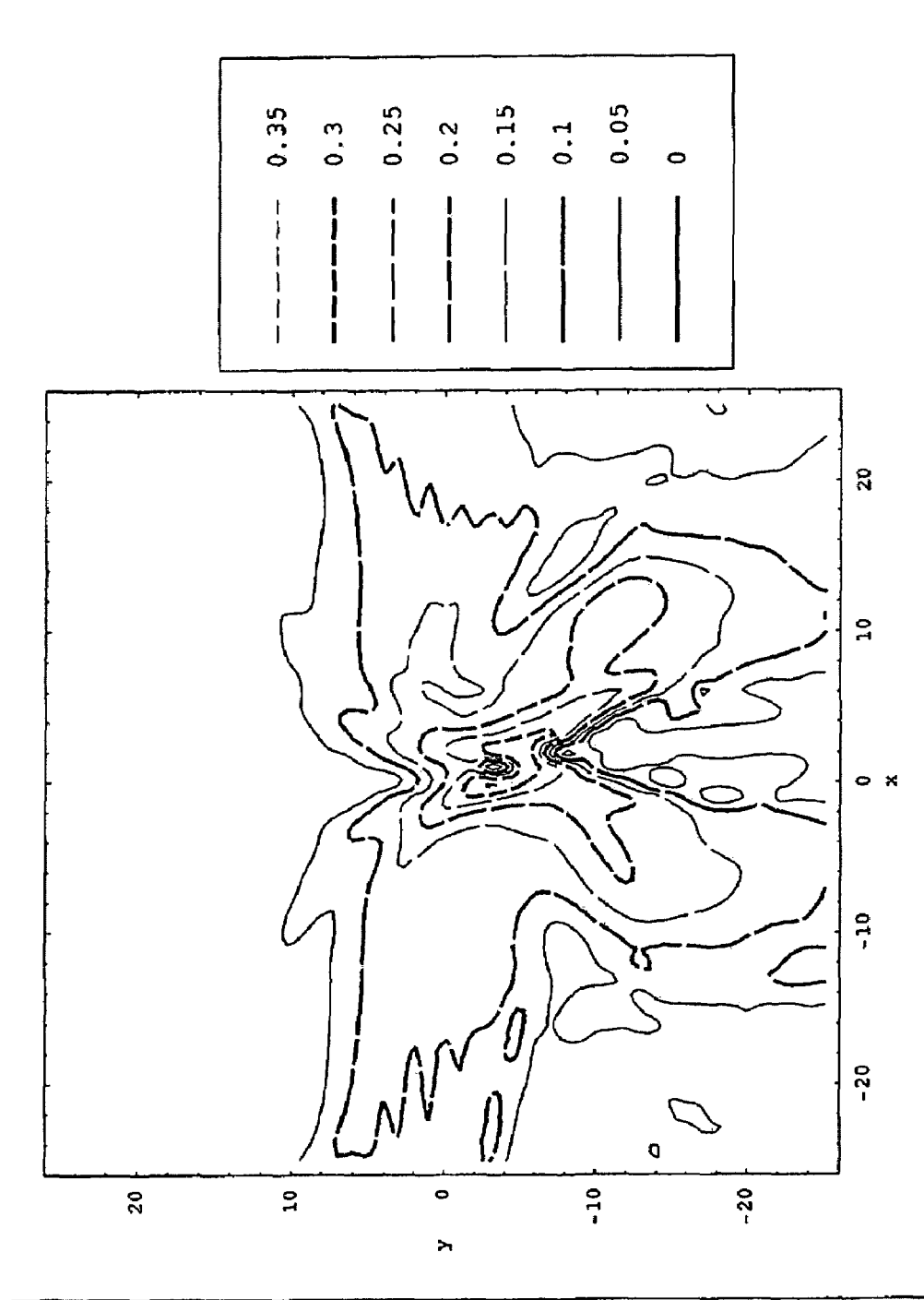
FIG. 3B is a plot of the gradient of absolute value of the surface astigmatism of the front surface of a lens according to exemplary embodiment 1 in dpt as a function of the coordinates (x, y) in mm.
Figure 3C:
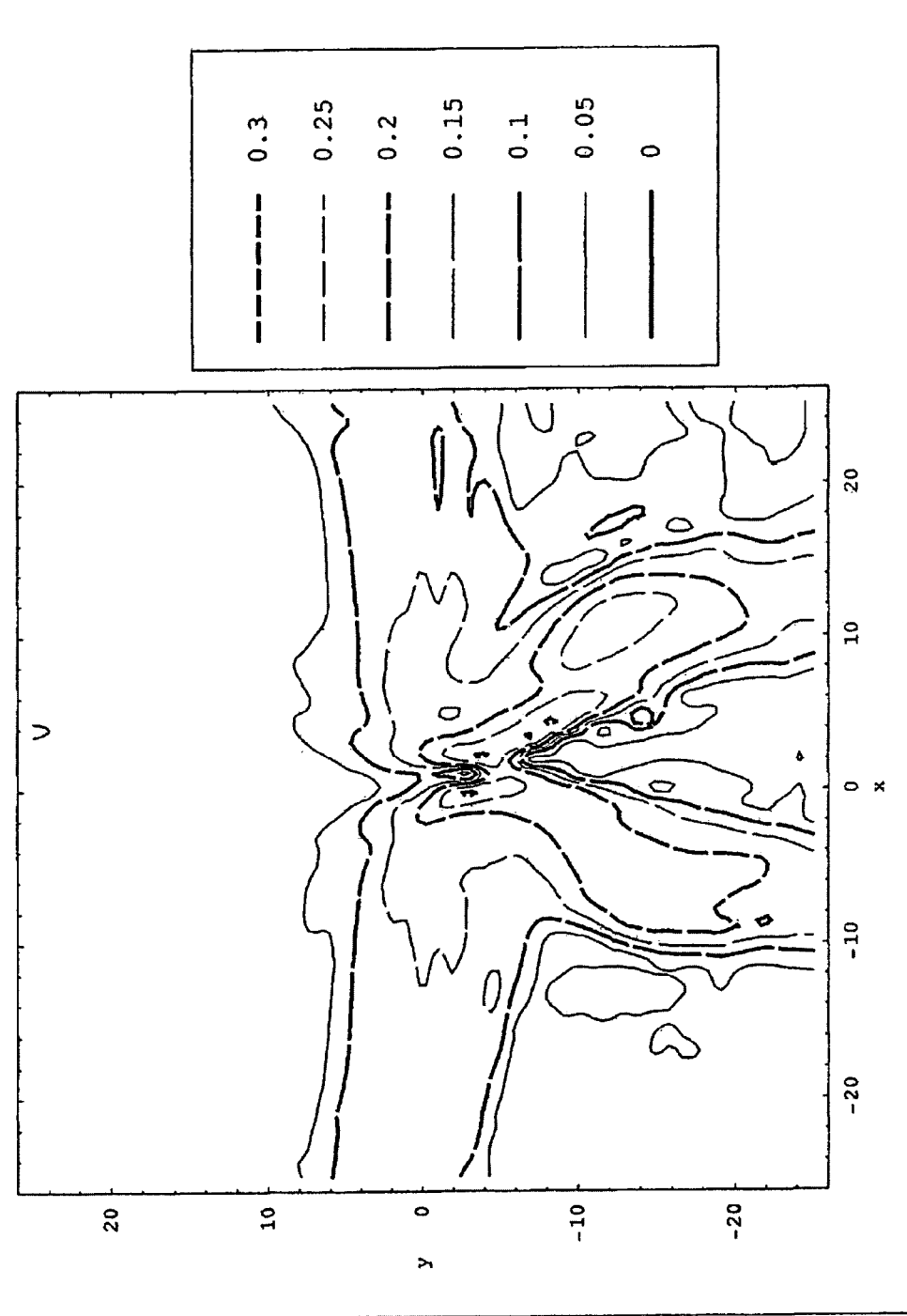
FIG. 3C is a plot of the gradient of absolute value of the surface astigmatism of the front surface of a lens according to exemplary embodiment 2 in dpt/mm as a function of the coordinates (x, y) in mm.

FIGS. 3A through 3C show the distribution of the gradient $|\mathrm{grad}(|\vec{A}|)|$ in dpt/mm of the absolute value of the astigmatism of the front surface as a function of the coordinates (x, y) in mm for the art (FIG. 3A), for exemplary embodiment 1 (FIG. 3B), and for exemplary embodiment 2 (FIG. 3C). The distribution of the gradient is represented by isolines at a distance of 0.05 dpt/mm.

Figure 4A:
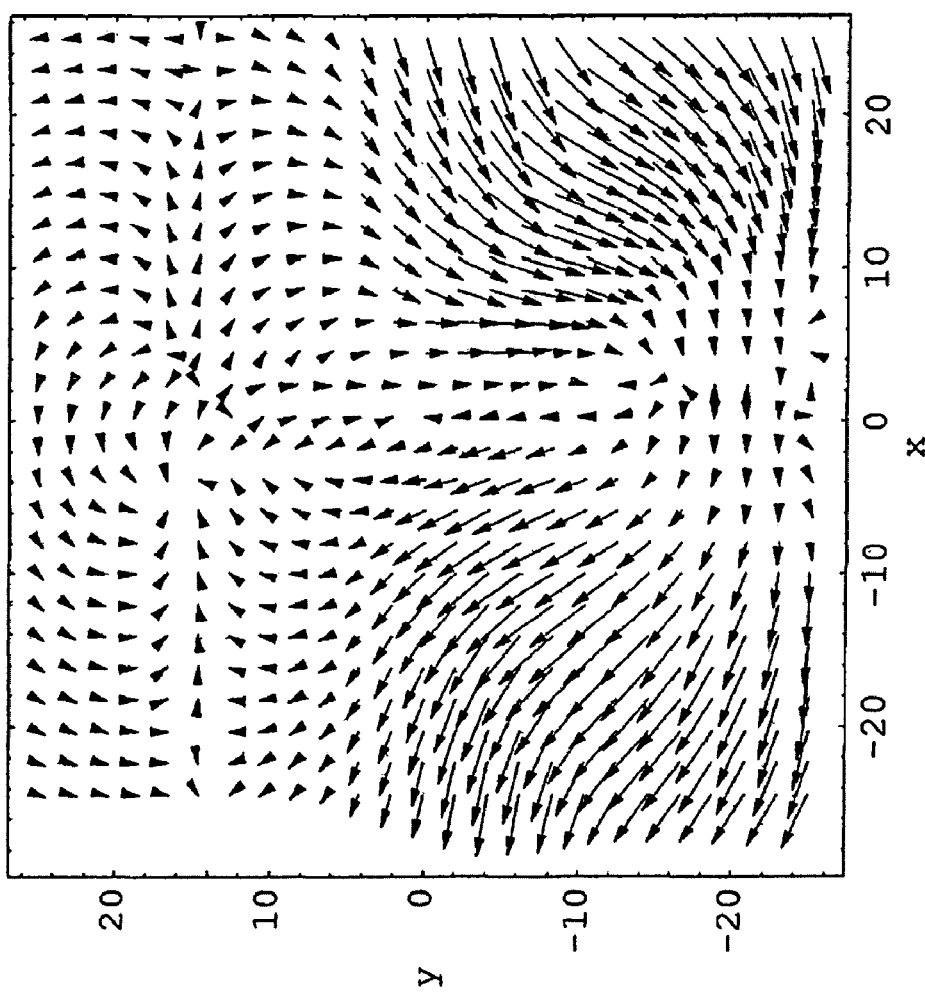
FIG. 4A is a view illustrating vector field of the surface astigmatism of the front surface of a lens according to the prior art as a function of the coordinates (x, y) in mm.
Figure 4B:
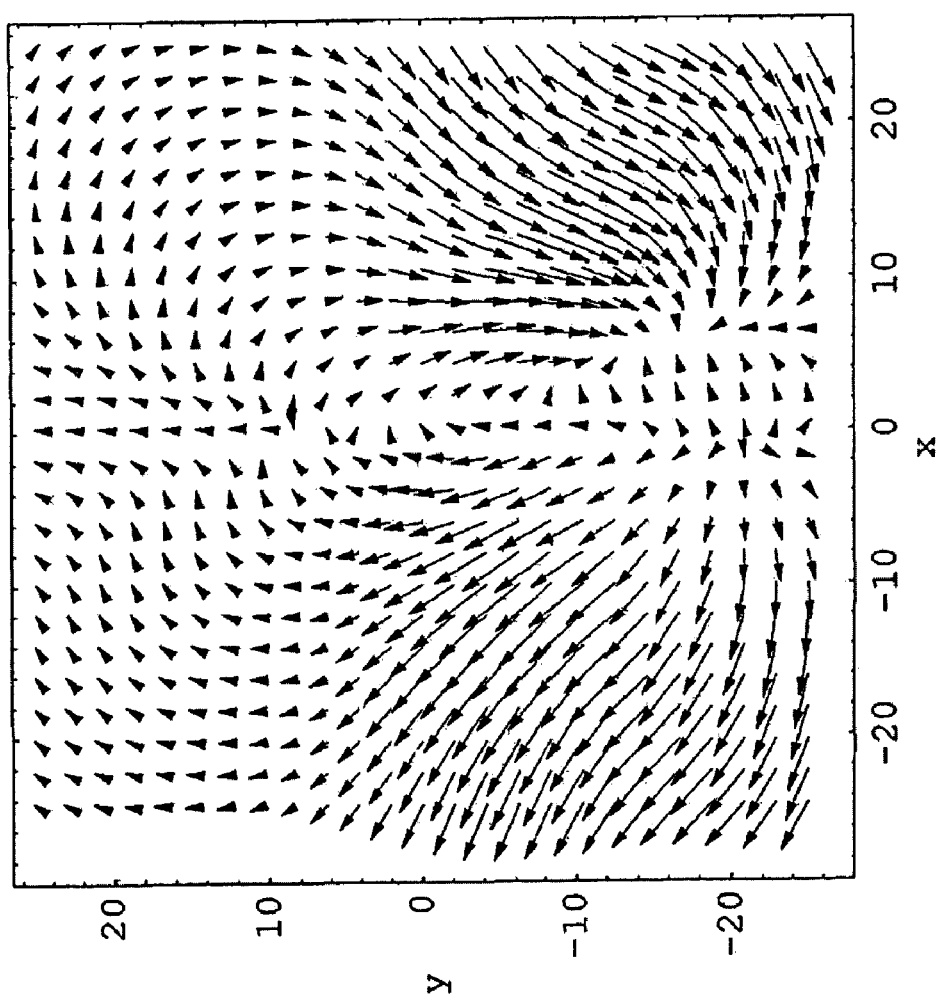
FIG. 4B is a view illustrating vector field of the surface astigmatism of the front surface of a lens according to exemplary embodiment 1 as a function of the coordinates (x, y) in mm.
Figure 4C:
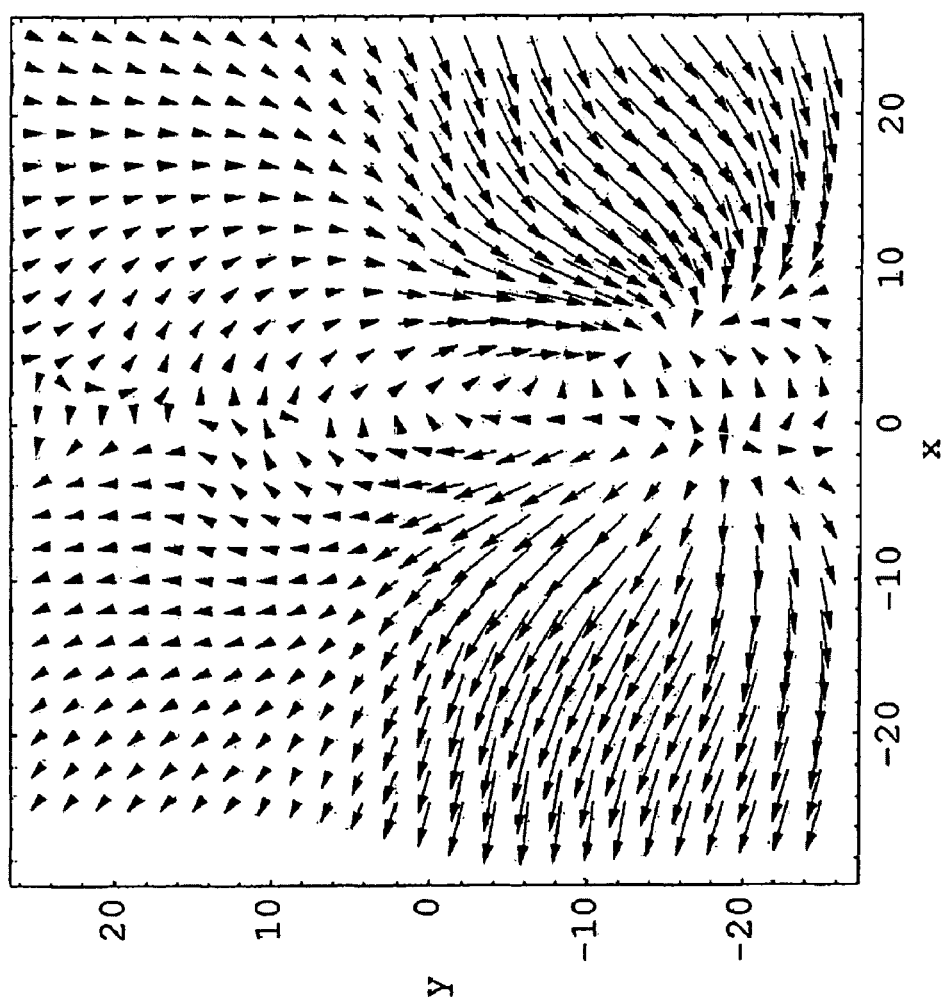
FIG. 4C is a view illustrating vector field of the surface astigmatism of the front surface of a lens according to exemplary embodiment 2 as a function of the coordinates (x, y) in mm.
Figure 5A:
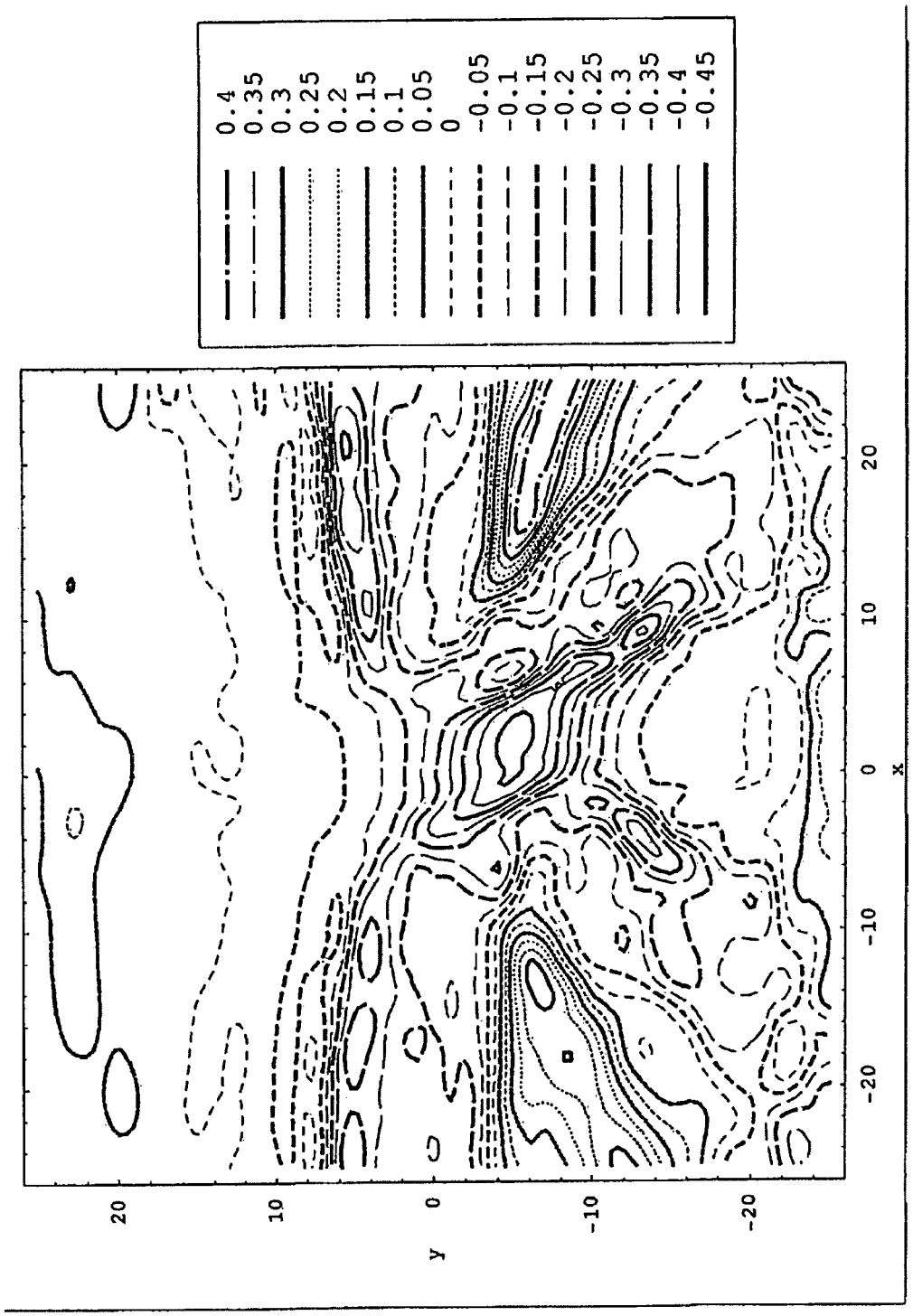
FIG. 5A is a rotation rot $\vec{A}$ of the surface astigmatism of the front surface of a lens according to the prior art in dpt/mm as a function of the coordinates (x, y) in mm.
Figure 5B:
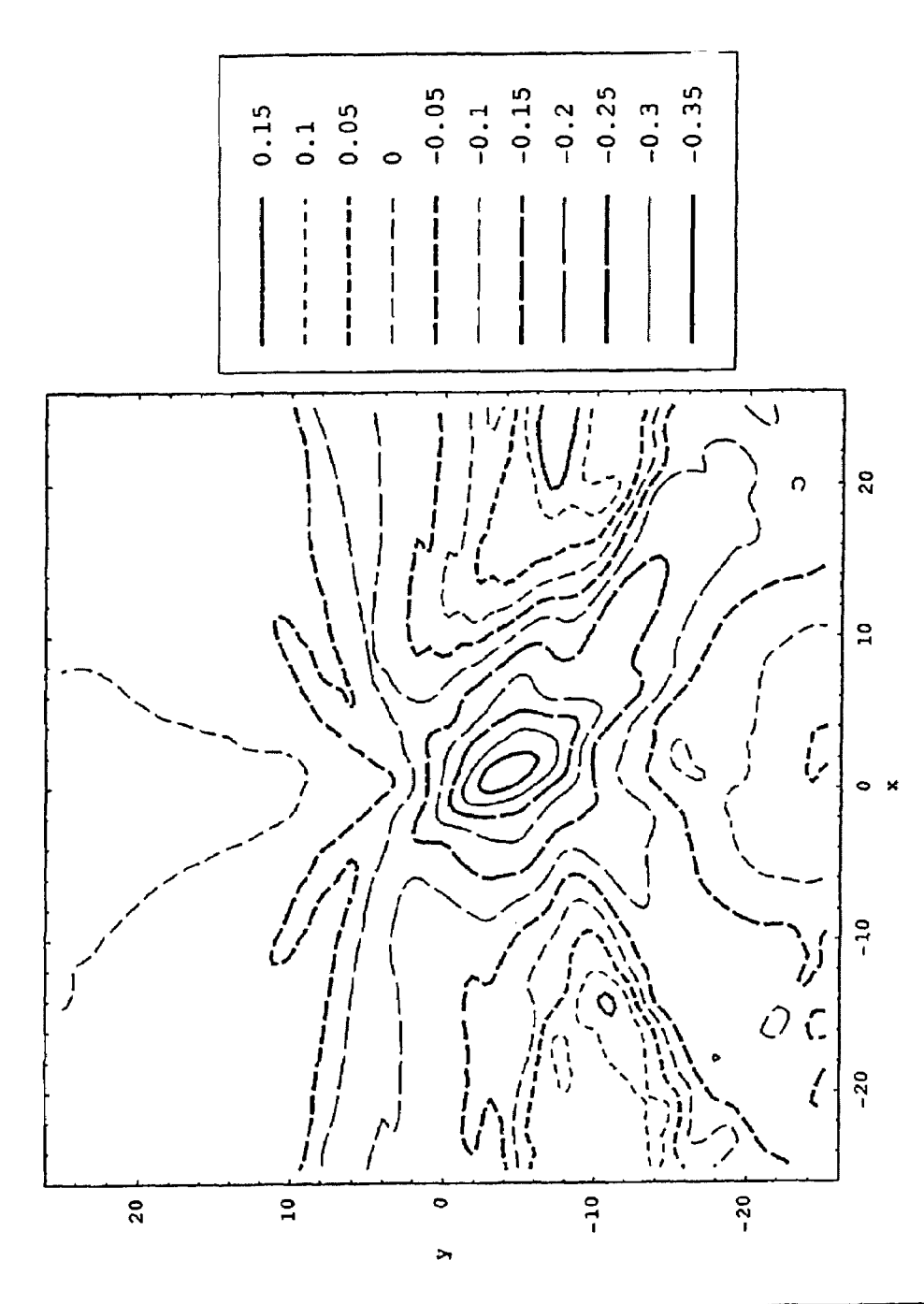
FIG. 5B is a rotation rot $\vec{A}$ of the surface astigmatism of the front surface of a lens according to exemplary embodiment 1 in dpt/mm as a function of the coordinates (x, y) in mm.
Figure 5C:
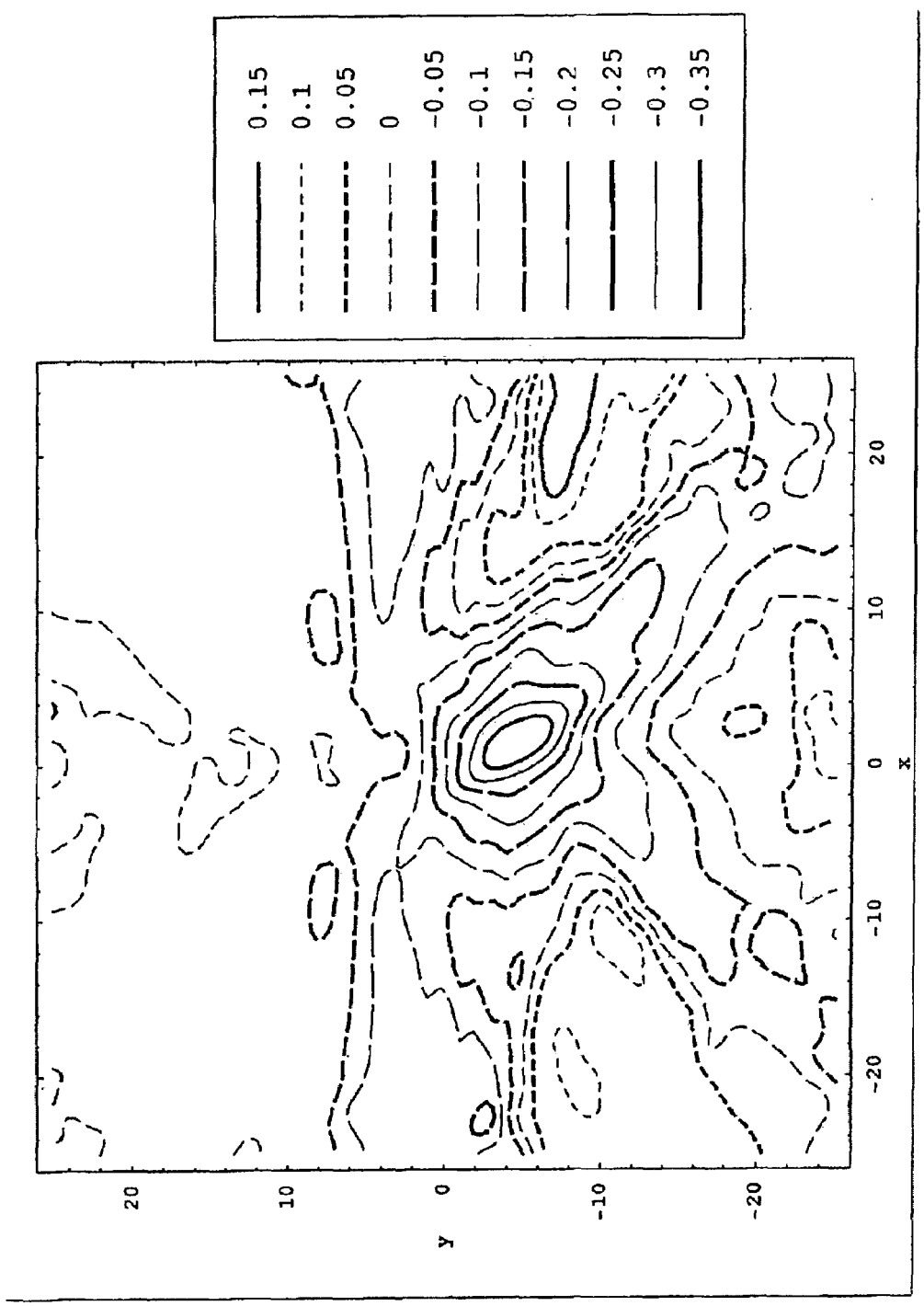
FIG. 5C is a rotation rot $\vec{A}$ of the surface astigmatism of the front surface of a lens according to exemplary embodiment 2 in dpt/mm as a function of the coordinates (x, y) in mm.
Figure 6A:
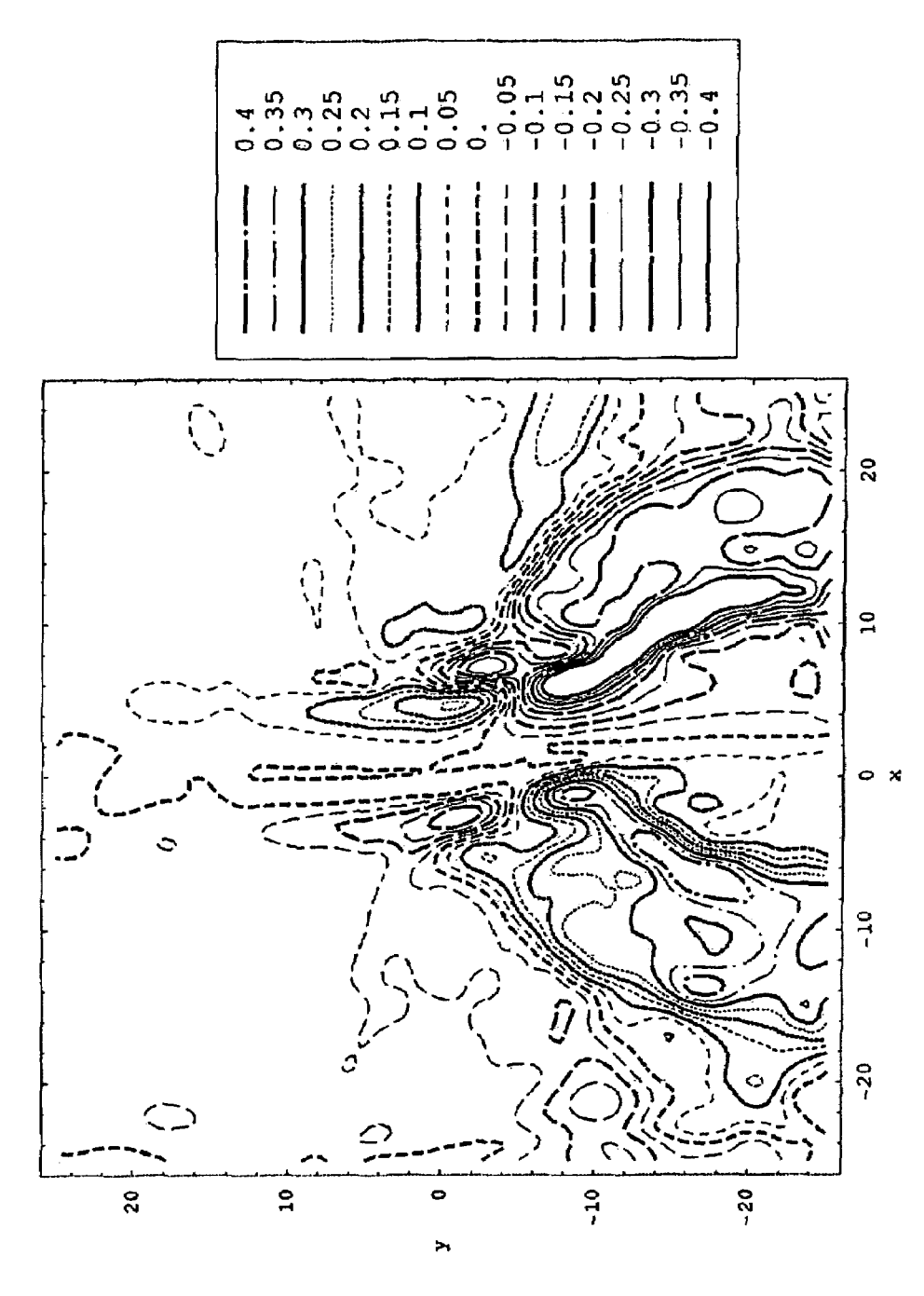
FIG. 6A is a divergence div $\vec{A}$ of the surface astigmatism of the front surface of a lens according to the prior art in dpt/mm as a function of the coordinates (x, y) in mm.
Figure 6B:
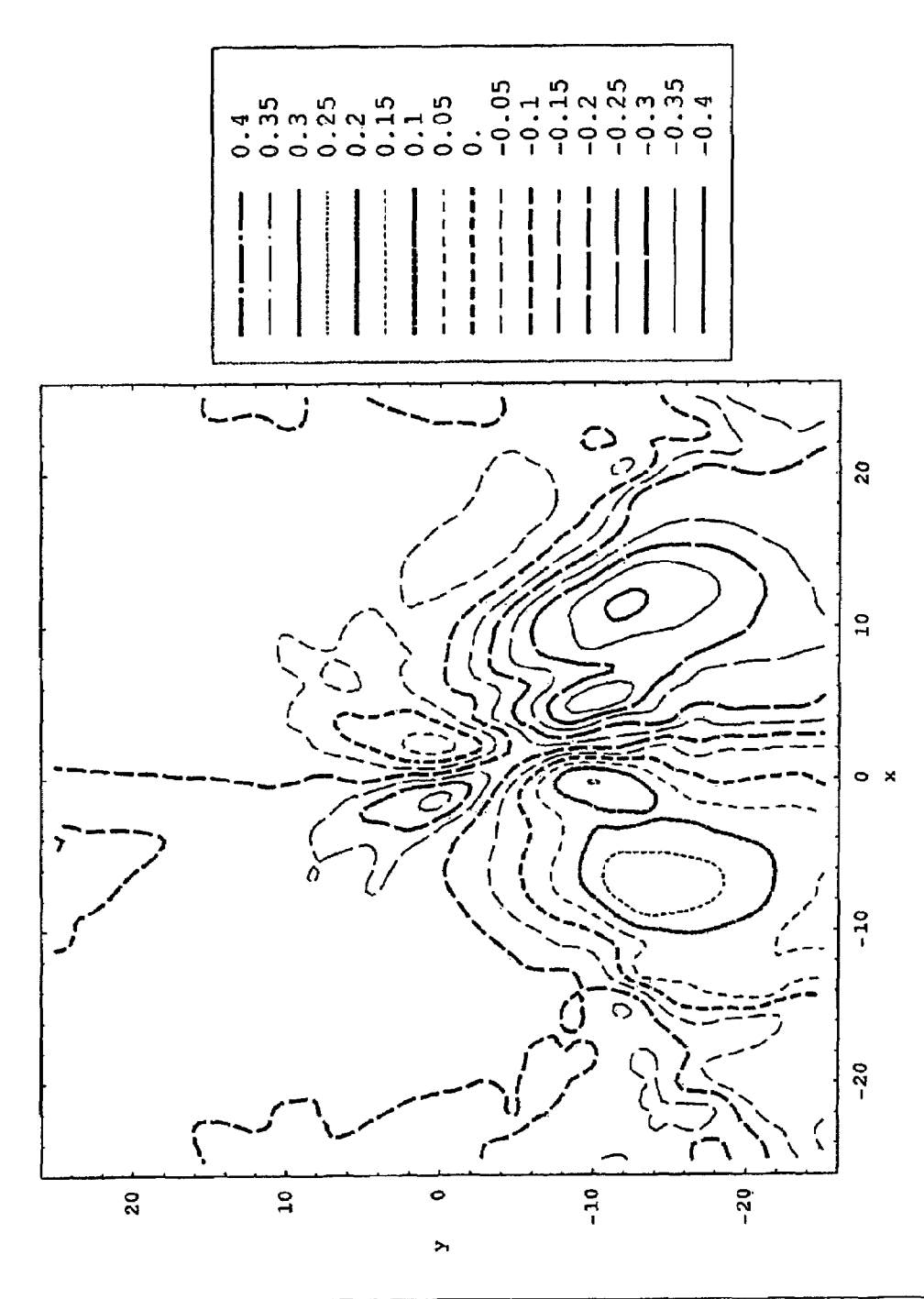
FIG. 6B is a divergence div $\vec{A}$ of the surface astigmatism of the front surface of a lens according to exemplary embodiment 1 in dpt/mm as a function of the coordinates (x, y) in mm.
Figure 6C:
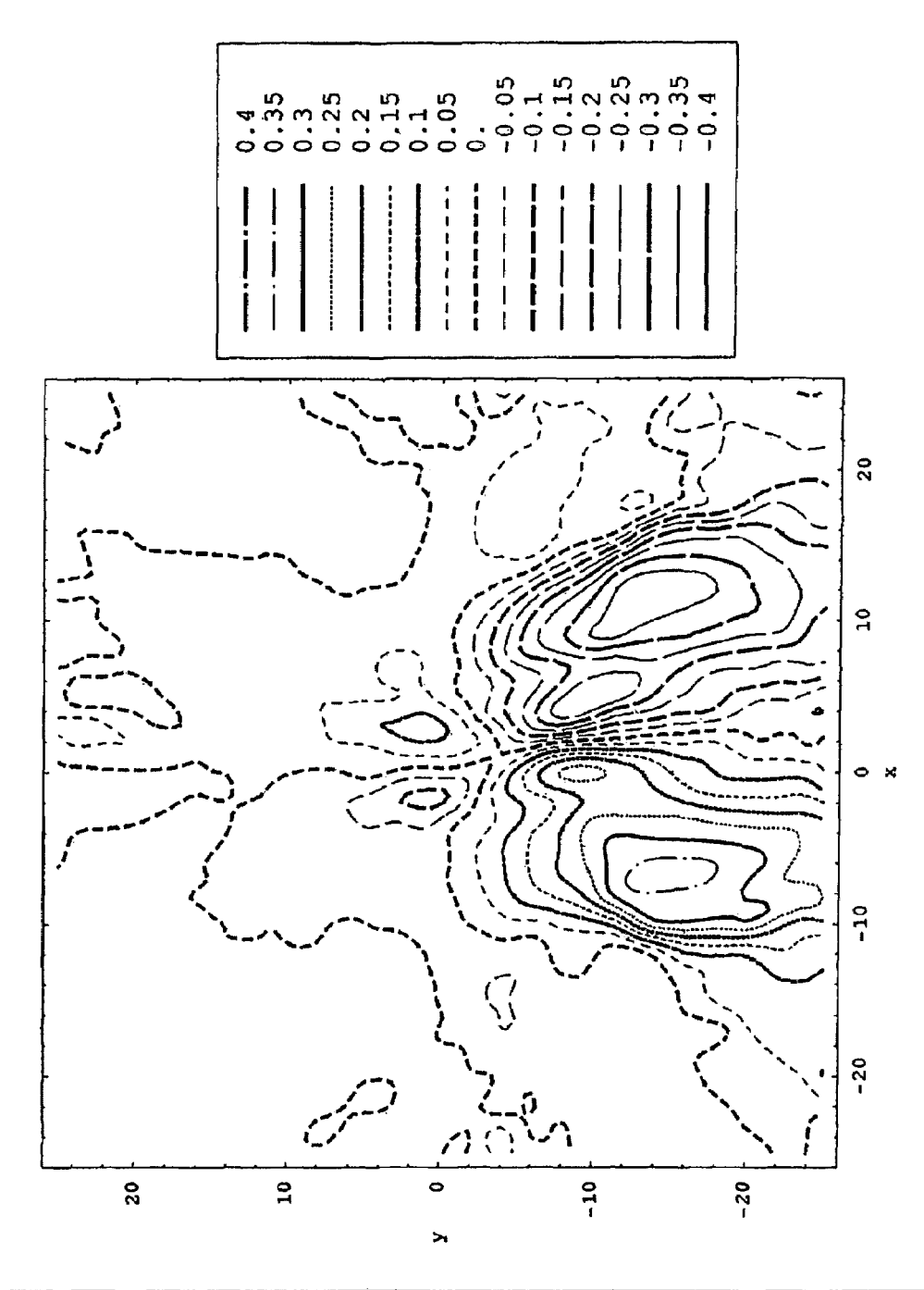
FIG. 6C is a divergence div $\vec{A}$ of the surface astigmatism of the front surface of a lens according to exemplary embodiment 2 in dpt/mm as a function of the coordinates (x, y) in mm.

In comparison with the distribution of the absolute value of the astigmatism which is shown in FIGS. 2A through 2C, a diagram of the distribution of the total vector field $\vec{A}$ of the astigmatism also contains the direction information. FIGS. 4A through 4C show the vector field of the surface astigmatism of the front surface as a function of the coordinates (x, y) in mm for the art (FIG. 4A), for exemplary embodiment 1 (FIG. 4B), and for exemplary embodiment 2 (FIG. 4C). Accordingly, FIGS. 5A through 5C show the distribution of the rotation of the astigmatism rot $\vec{A}$ in dpt/mm as a function of the coordinates (x, y) in mm for the prior art (FIG. 5A), for exemplary embodiment 1 (FIG. 5B), and for exemplary embodiment 2 (FIG. 5C) represented by isolines. FIGS. 6A through 6C show the distribution of the divergence div $\vec{A}$ in dpt/mm as a function of the coordinates (x, y) in mm for the prior art (FIG. 6A), for exemplary embodiment 1 (FIG. 6B), and for exemplary embodiment 2 (FIG. 6C) in the form of isolines.

It can be seen from FIG. 4A for the prior art that the vector cambers of the astigmatism $\vec{A}$ in the region around (x, y)=(20, −6) mm all have approximately the same length but vary greatly in direction. However, this variation cannot be perceived on the basis of the diagram of the absolute value of the astigmatism $|\vec{A}|$. For example, the size of the gradient of the absolute value $|\mathrm{grad}(|\vec{A}|)\vec{A}|$ in the region around (x, y)=(20, −6), as shown in FIG. 3A assumes values which are not above 0.1 dpt/mm. The great variations in the astigmatism $\vec{A}$ become visible only through the size of the rotation of the astigmatism rot $\vec{A}$ which assumes a value of more than 0.4 dpt/mm, as shown in FIG. 5A for example. In comparison with that, the size of rotation of the astigmatism rot $\vec{A}$ in the same region (x, y)=(20, −6) for exemplary embodiment 1 (FIG. 5B) and for exemplary embodiment 2 (FIG. 5C) of the invention are of an order of magnitude of only 0.15 dpt/mm.

Other quantitative features of the divergence div $\vec{A}$ and rotation rot $\vec{A}$ of the astigmatism of the lenses according to exemplary embodiment 1 and 2 as well as the prior art are illustrated below on the basis of horizontal sections (x:variable, y=const).

In each case hereinafter, FIG. -A (i.e., FIGS. 7A through 11A) is based on the prior art, FIG. -B (FIGS. 7B through 11B) is based on the first exemplary embodiment and FIG. C (FIGS. 7C through 11C) is based on the second exemplary embodiment.

Figure 7A:
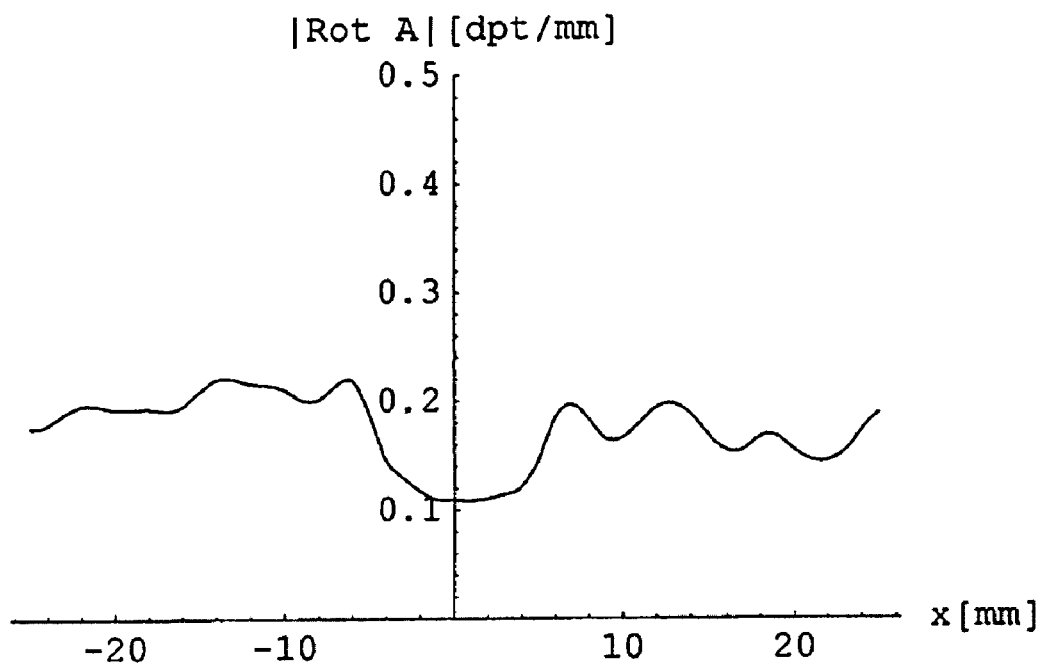
FIG. 7A is a plot of the absolute value of the rotation |rot $\vec{A}$| of the surface astigmatism of the front surface of a lens according to the art in dpt/mm at a horizontal section y=3 mm.
Figure 7B:
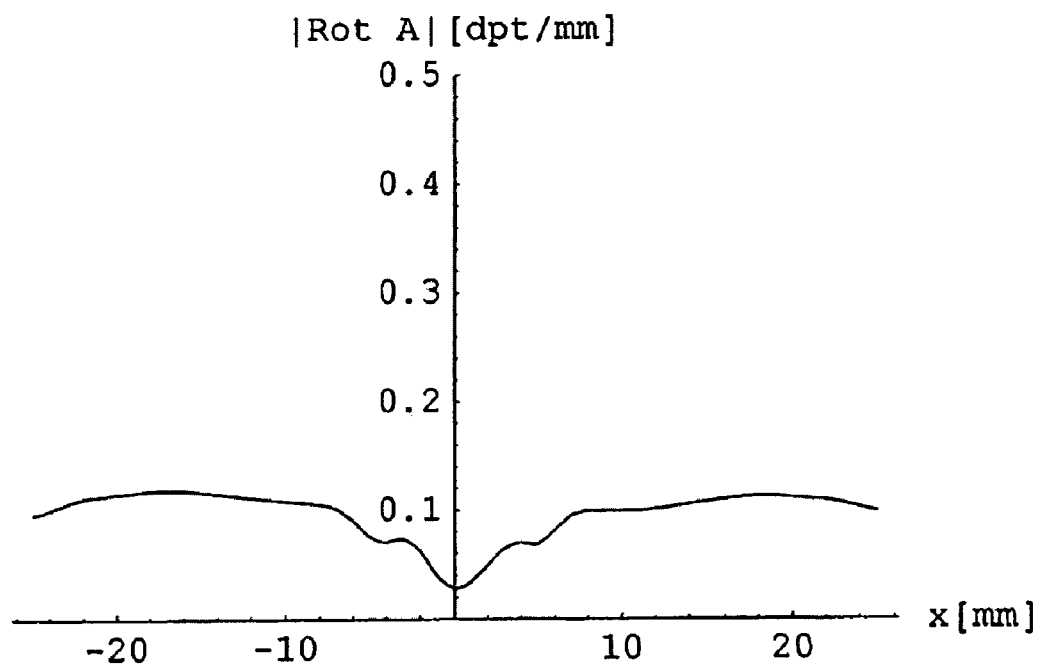
FIG. 7B is a plot of the absolute value of the rotation |rot $\vec{A}$| of the surface astigmatism of the front surface of a lens according to exemplary embodiment 1 in dpt/mm at a horizontal section y=4.8 mm.
Figure 7C:
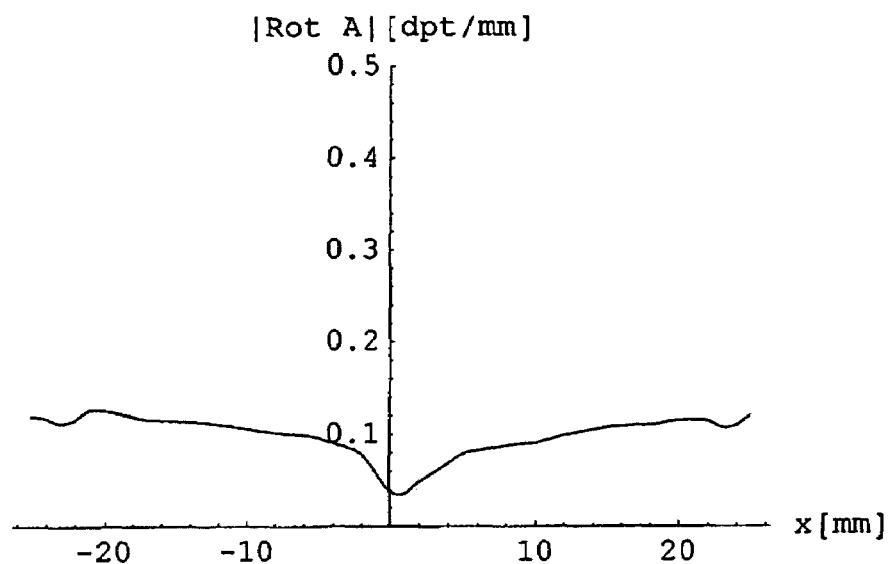
FIG. 7C is a plot of the absolute value of the rotation |rot $\vec{A}$| of the surface astigmatism of the front surface of a lens according exemplary embodiment 2 in dpt/mm at a horizontal section y=3 mm.
Figure 7D:
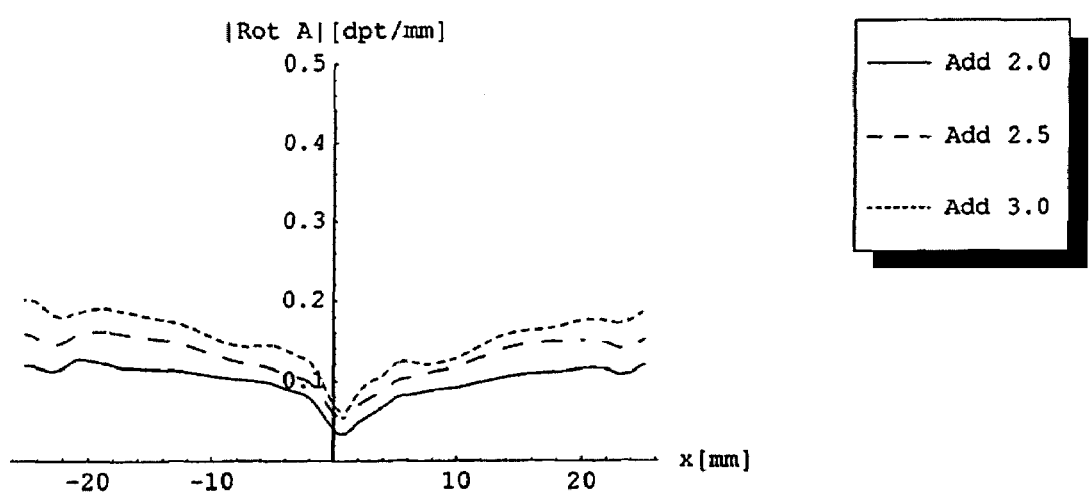
FIG. 7D is a plot of the absolute value of the rotation |rot $\vec{A}$| of the surface astigmatism of the front surface of a series of lenses according to exemplary embodiment 2 having additions of 2.0, 2.5 and 3.0 dpt in dpt/mm at a horizontal section y=3 mm.

FIG. 7D is based on a series with additions of 2.0, 2.5 and 3.0 dpt of front surfaces of the same type of design as the front surface in exemplary embodiment 2.

In each case, FIG. -D (FIGS. 8D through 11D) is based on a series of front surfaces of the these design type as the front surface of exemplary embodiment 1, said front surfaces differing only through their additions in the use position. The series of front surfaces shown here has additions of 1.0, 2.0, 2.5, 3.0 and 3.5 dpt respectively.

In each case, FIG. E (FIGS. 8E through 11E) is based on a series of front surfaces of the same type of design as the front surface of exemplary embodiment 2, these front surfaces differing only in their additions in the use position. The series of front surfaces shown here has additions of 1.0, 2.0, 2.5, 3.0 and 3.5 dpt respectively.

Positions of the Extremes of div $\vec{A}$

The rotation rot $\vec{A}$ and divergence div $\vec{A}$ of the astigmatism should be minimized in a good lens. Since div $\vec{A}$ normally assumes extreme values within a lens, a design is better when these extremes are located farther toward the outer periphery of the lens.

In the prior art, the divergence of the astigmatism div $\vec{A}$ has many pronounced extremes that are close together as shown in FIG. 6A. In comparison with that, the distribution of the divergence of the astigmatism div $\vec{A}$ for front surfaces according to this invention is very smooth (see FIGS. 6B and 6C for exemplary embodiment 1 and/or exemplary embodiment 2). There are either no extremes close to the center of the lens or they are hardly pronounced. The only mentionable extremes are definitely outside of the range y≧−8 mm. The term "mentionable" refers to an extreme the absolute value of which is more than (0.1/mm) times the addition. In exemplary embodiment 1 the maximum value of the divergence of the astigmatism $|\mathrm{div}\,\vec{A}|$ is assumed at the minimum at (x, y)=(11.3, −11.9) mm and amounts to 0.31 dpt/mm. In exemplary embodiment 2, the maximum value of 0.39 dpt/mm is reached at (x, y)=(11.9, −13.8). In comparison with that, the maximum value of the divergence $|\mathrm{div}\,\vec{A}|$ for the state of the art is 0.6 dpt/mm and is assumed to be much closer to the midpoint of the lens at the point (x, y)=(6.1, −8.3).

The property of no (or no mentionable) extremes of the divergence of the astigmatism div $\vec{A}$ being inside the range y≧−8 mm is applicable to all additions of the design according to this invention in the series 1.0, 2.0, 2.5, 3.0, 3.5 dpt (see Table 2A and Table 2B). Table 2A shows the positions of the extremes (maximum and minimum) of the divergence of the astigmatism div $\vec{A}$ for a lens according to exemplary embodiment 1 of the inventions and Table 2B shows the positions of the extremes of the divergence of the astigmatism div $\vec{A}$ for a lens according to exemplary embodiment 2 of this invention. Even the range y≧−9 mm is free of extremes in the series beyond the addition 2.0.

TABLE 2A

| Addition | Minimum (dpt/mm) Position (x, y) (mm) | Maximum (dpt/mm) Position (x, y) (mm) |
|---|---|---|
| 1.0 | −0.181 (6.0, −9.4) | 0.171 (−1.5, −9.1) |
| 2.0 | −0.309 (11.3, −11.9) | 0.287 (−7.0, −13.4) |
| 2.5 | −0.373 (11.5, −12.1) | 0.344 (−7.0, −13.6) |
| 3.0 | −0.440 (12.0, −11.8) | 0.406 (−7.0, −13.9) |
| 3.5 | −0.502 (12.8, −12.0) | 0.452 (−6.3, −14.0) |

TABLE 2B

| Addition | Minimum (dpt/mm) Position (x, y) (mm) | Maximum (dpt/mm) Position (x, y) (mm) |
|---|---|---|
| 1.0 | −0.191 (5.0, −8.4) | 0.164 (−3.0, −13.0) |
| 2.0 | −0.386 (11.9, −13.8) | 0.372 (−6.7, −14.5) |
| 2.5 | −0.508 (10.9, −13.4) | 0.486 (−6.5, −15.2) |
| 3.0 | −0.668 (11.0, −13.8) | 0.590 (−5.4, −15.6) |
| 3.5 | −0.808 (10.2, −12.0) | 0.712 (−3.8, −15.5) |

Monotonic Change in Rotation of the Astigmatism |rot $\vec{A}$| in the Horizontal Section Variations in the rotation of the astigmatism |rot $\vec{A}$| close to the center of the lens are especially problematical. Therefore, a lens with a negligible value of |rot $\vec{A}$| at x=0 mm and the gradual and most uniform possible increase in the direction of finite x values is desirable.

In contrast with the prior art in particular, in the far vision part of the lens according to this invention, there is a horizontal section along which the increase in |rot $\vec{A}$| is monotonic over a range covering at least |x|≦16 mm. The exact position of the horizontal section depends on the design and varies between y=3 mm and y=5 mm. Since the lenses according to this invention (exemplary embodiment 1 and exemplary embodiment 2) and according to the prior art have different designs, the horizontal section for exemplary embodiment 1 is at y=4.8 mm (FIG. 7B), that for exemplary embodiment 2 is at y=3 mm (FIG. 7C) and the corresponding horizontal section for the prior art is at y=3 mm (FIG. 7A).

FIG. 7B shows a horizontal section of the absolute value of the rotation of the astigmatism |rot $\vec{A}$| for exemplary embodiment 1 of the invention y=4.8 mm in comparison with the corresponding section in the state of the art (FIG. 7A). For an inventive lens according to exemplary embodiment 1, the value of |rot $\vec{A}$| at x=0 mm has dropped to 30% of the previous value (FIG. 7B) and the increase for finite x values is gradual and monotonic in the entire range |x|≦16 mm, whereas in the prior art, there are great fluctuations and multiple extremes in the same range.

For the lens according to exemplary embodiment 2 of this invention, the monotonic area is even located at y=3 mm, i.e., closer to the center of the lens, and the monotonic property even extends to the area |x|≦20 mm as depicted in FIG. 7C.

Even if the absolute value of the rotation of the astigmatism |rot $\vec{A}$| depends on the addition, the feature of the monotonic increase is preserved, at least for exemplary embodiment 2 in the range |x|≦20 mm for multiple additions almost unchanged. Besides addition 2.0, the design according to this invention for exemplary embodiment 2 also meets the monotonic requirement for addition 2.5 dpt within the series with additions of 1.0, 2.0, 2.5, 3.0, 3.5 dpt and for the addition 3.0 the dependence |rot $\vec{A}$| does not have any mentionable extremes in the range |x|≦20 mm as shown in FIG. 7D.

Extreme Values of Rotation and Divergence of Astigmatism

This invention is compared below with the prior art with respect to maximum values assumed by the absolute value of rotation |rot $\vec{A}$| and divergence div $\vec{A}$ of the astigmatism along characteristic horizontal sections (x, y=const).

Figure 8A:
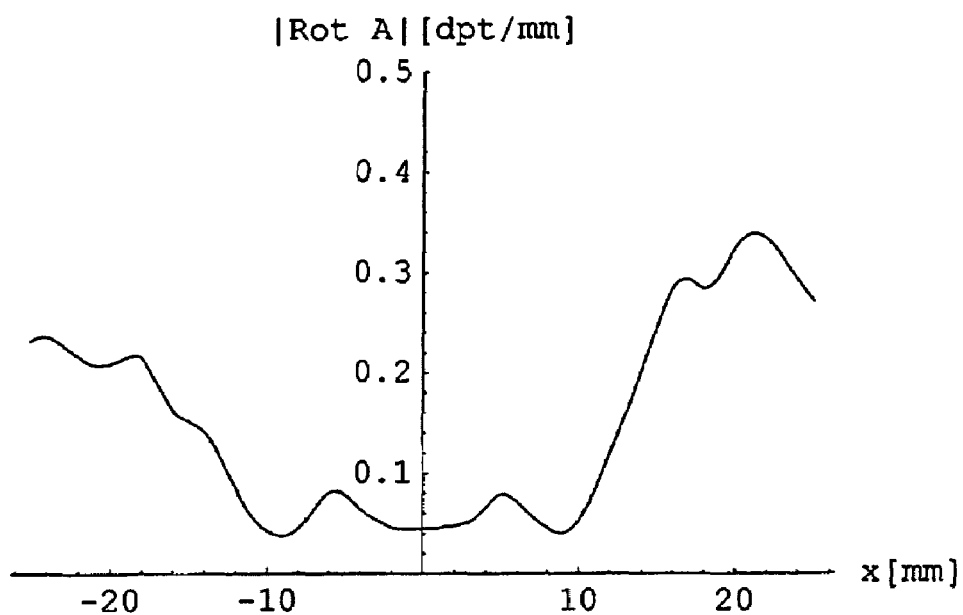
FIG. 8A is a plot of the absolute value of the rotation |rot $\vec{A}$| of the surface astigmatism of the front surface of a lens according to the state of the art in dpt/mm at a horizontal section y=6 mm.
Figure 8B:
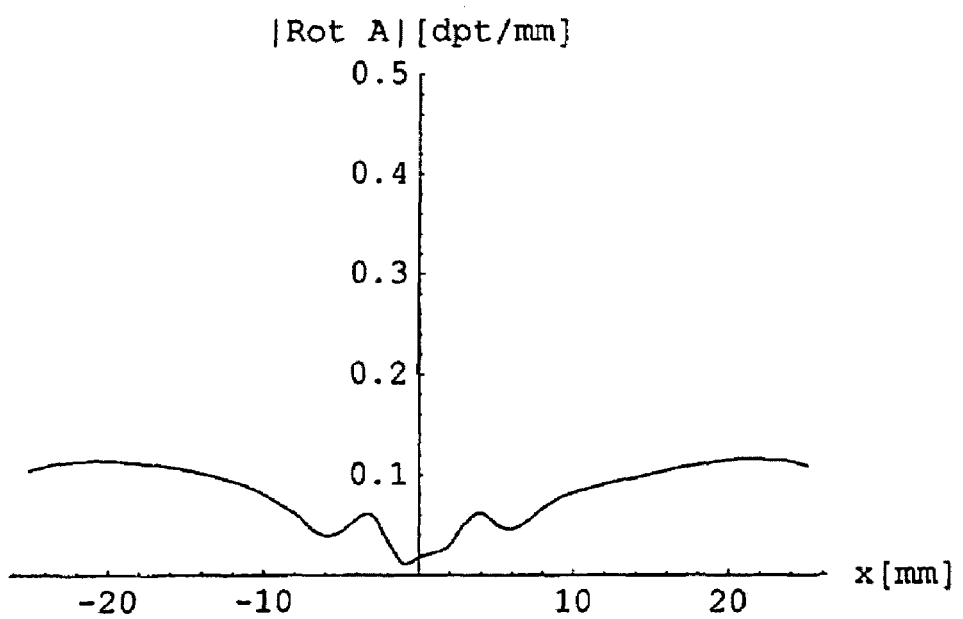
FIG. 8B is a plot of the absolute value of the rotation |rot $\vec{A}$| of the surface astigmatism of the front surface of a lens according to exemplary embodiment 1 in dpt/mm at a horizontal section y=6 mm.
Figure 8C:
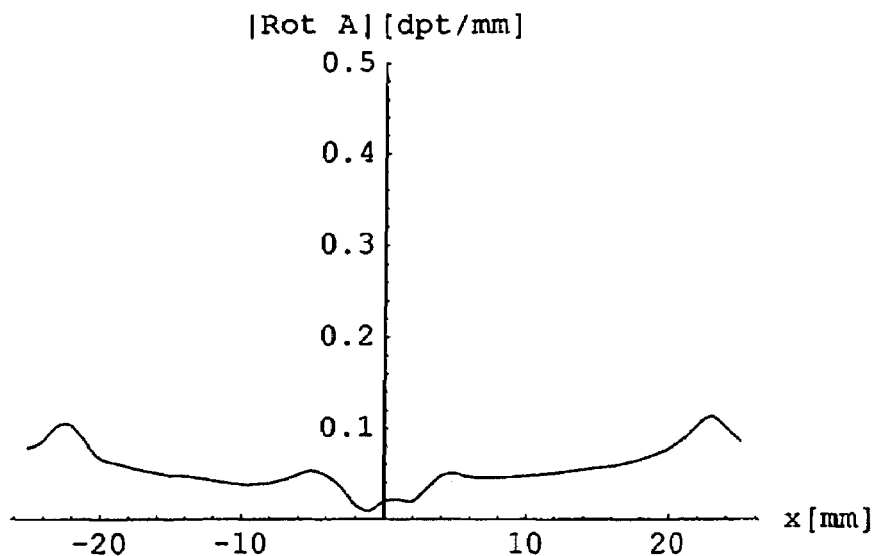
FIG. 8C is a plot of the absolute value of the rotation |rot $\vec{A}$| of the surface astigmatism of the front surface of a lens according exemplary embodiment 2 in dpt/mm at a horizontal section y=6 mm.

FIGS. 8A through 8D show the plot of the absolute value of the rotation of the astigmatism in dpt/mm in the horizontal section at y=+6 mm. As shown in FIG. 8A, the absolute value of the rotation of the astigmatism |rot $\vec{A}$| in the horizontal section at y=+6 mm varies greatly for the state of the art, assuming values of more than 0.3 dpt/mm at the maximum. By comparison, the absolute value of the rotation of the astigmatism |rot $\vec{A}$| amounts to less than 0.03 dpt/mm close to the principal line in the case of this invention for exemplary embodiment 1 and does not increase beyond 0.12 dpt/mm along the entire horizontal section, as shown in FIG. 8B. For exemplary embodiment 2, |rot $\vec{A}$| also falls below a value of 0.03 dpt/mm near the principal line and does not increase above 0.12 dpt/mm along the entire horizontal section, as shown in FIG. 8C.

Figure 8D:
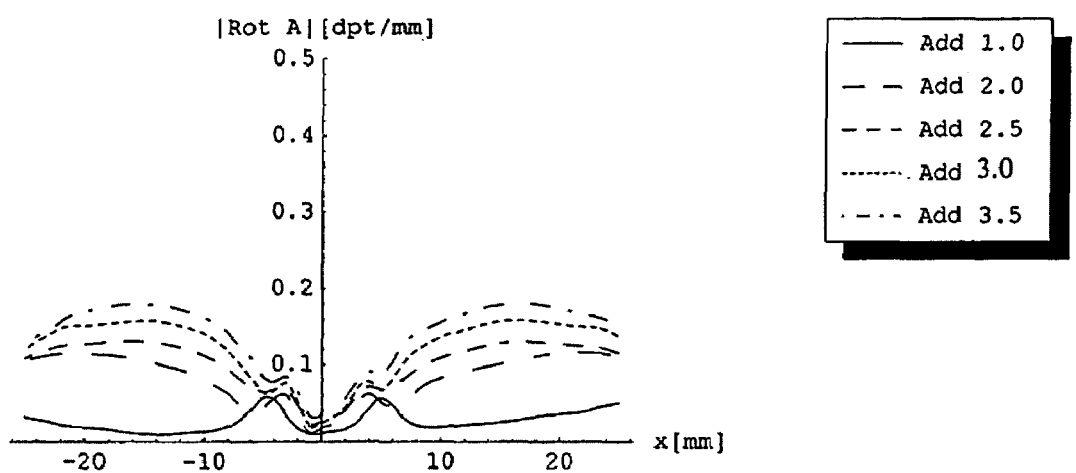
FIG. 8D is a plot of the absolute value of the rotation |rot $\vec{A}$| of the surface astigmatism of the front surface of a series of lenses according to exemplary embodiment 1 having additions of 1.0, 2.0, 2.5, 3.0 and 3.5 dpt in dpt/mm at a horizontal section y=6 mm.
Figure 8E:
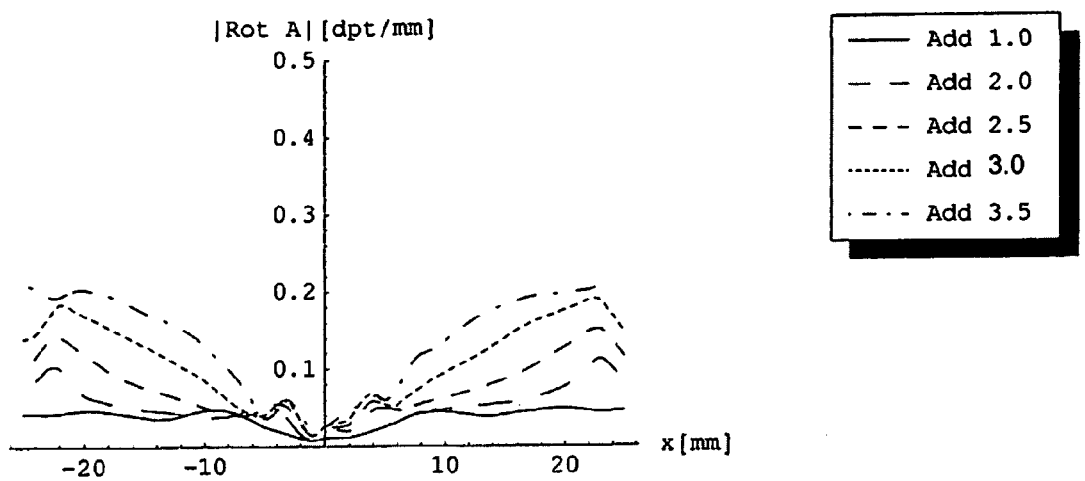
FIG. 8E is a plot of the absolute value of the rotation |rot $\vec{A}$| of the surface astigmatism of the front surface of a series of lenses according to exemplary embodiment 2 having additions of 1.0, 2.0, 2.5, 3.0 and 3.5 dpt in dpt/mm at a horizontal section y=6 mm.

The quantity |rot $\vec{A}$| is scaled approximately linearly with the addition, as shown FIG. 8D (exemplary embodiment 1) and FIG. 8E (exemplary embodiment 2) for a series of lenses with additions of 1.0, 2.0, 2.5, 3.0 and 3.5 dpt. In particular the maximum value is scaled linearly, namely according to the following dependence for exemplary embodiment 1:

$$|\text{rot } \vec{A}|_{max} \approx 0.06 \text{ addition/dpt} \cdot \text{dpt/mm}$$

and according to the following dependence for exemplary embodiment 2:

$$|\text{rot } \vec{A}|_{max} \approx 0.07 \text{ addition/dpt} \cdot \text{dpt/mm}.$$

Figure 9A:
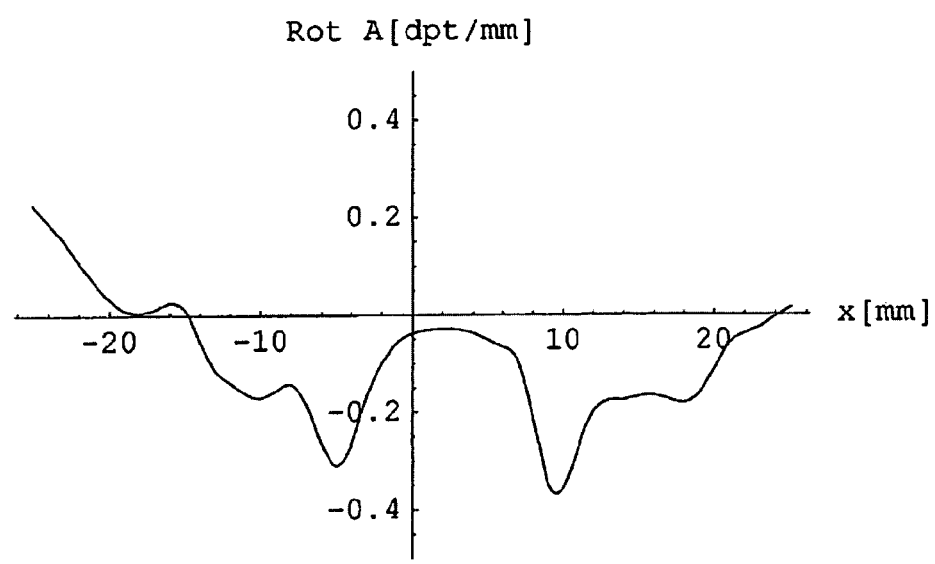
FIG. 9A is a plot of the absolute value of the rotation |rot $\vec{A}$| of the surface astigmatism of the front surface of a lens according to the art in dpt/mm at a horizontal section y=−14 mm.
Figure 9B:
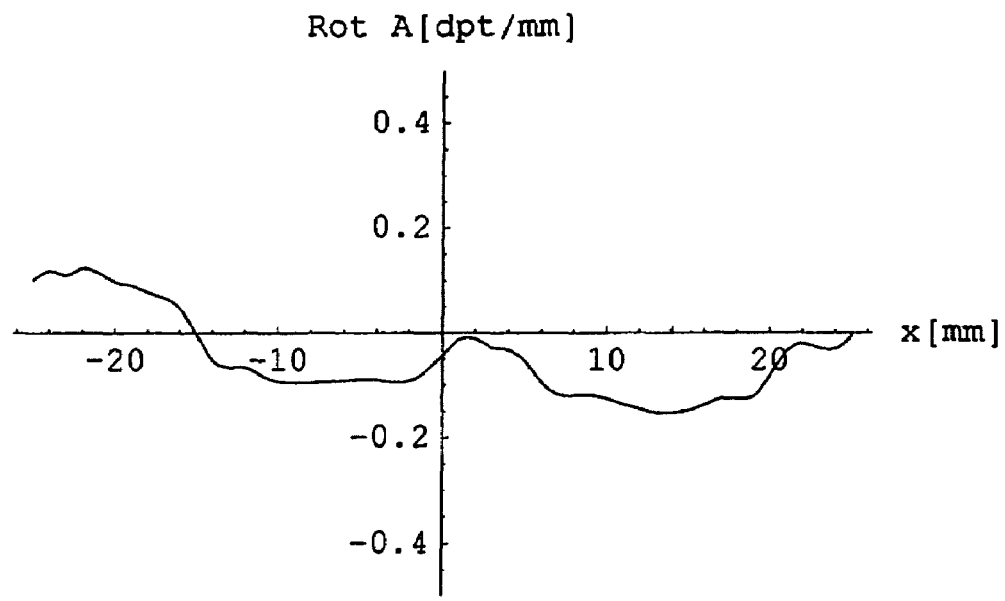
FIG. 9B is a plot of the absolute value of the rotation |rot $\vec{A}$| of the surface astigmatism of the front surface of a lens according to exemplary embodiment 1 in dpt/mm at a horizontal section y=−14 mm.
Figure 9C:
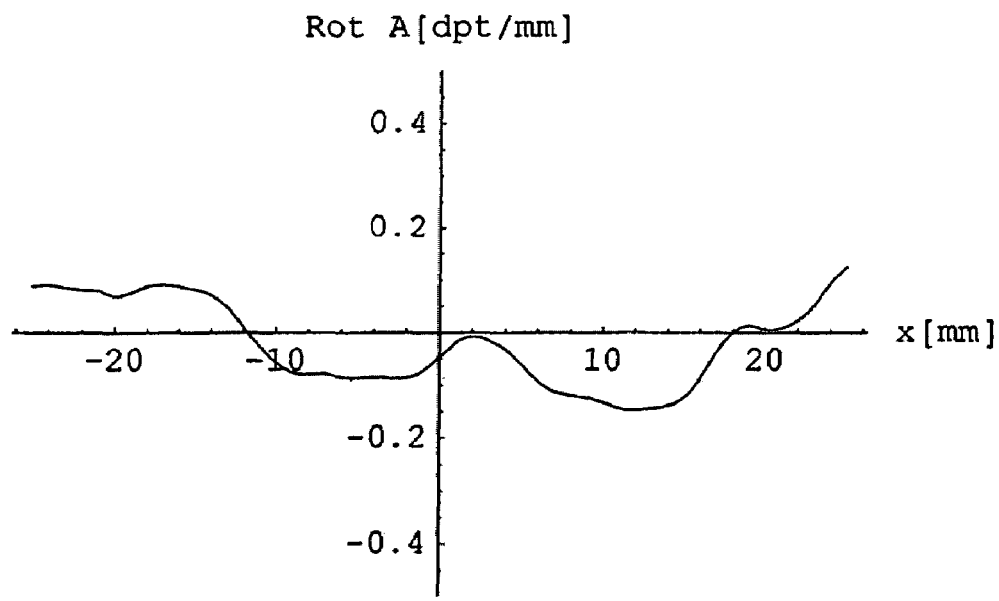
FIG. 9C is a plot of the absolute value of the rotation |rot $\vec{A}$| of the surface astigmatism of the front surface of a lens according exemplary embodiment 2 in dpt/mm at a horizontal section y=−14 mm.
Figure 9D:
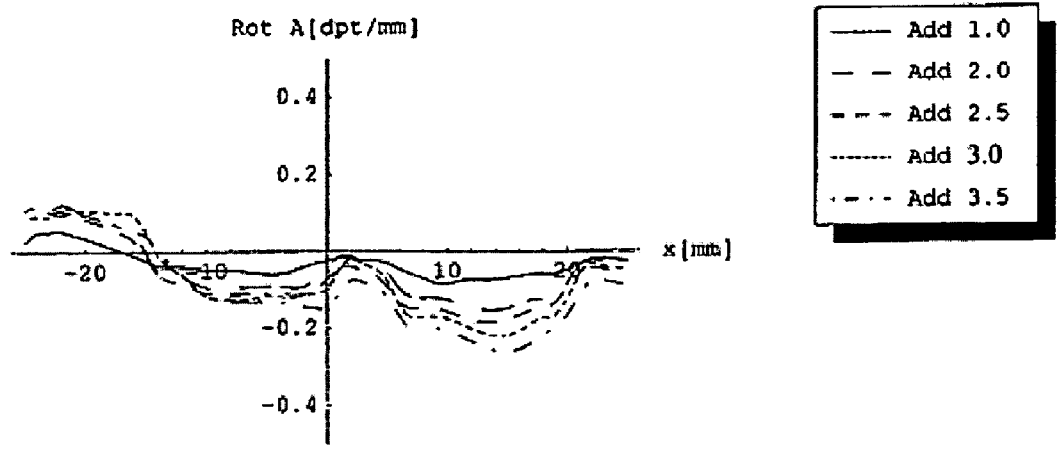
FIG. 9D is a plot of the absolute value of the rotation |rot $\vec{A}$| of the surface astigmatism of the front surface of a series of lenses according to exemplary embodiment 1 having additions of 1.0, 2.0, 2.5, 3.0 and 3.5 dpt in dpt/mm at a horizontal section y=−14 mm.

FIGS. 9A through 9E show the plot of the absolute value of the rotation of the astigmatism $|\text{rot } \vec{A}|$ in dpt/mm in the section at y=−14 mm. FIGS. 9A through 9C show the plot of $|\text{rot } \vec{A}|$ for a lens with addition of 2.0 dpt according to the prior art (FIG. 9A), according to exemplary embodiment 1 (FIG. 9B) and according to exemplary embodiment 2 (FIG. 9C). FIG. 9D (exemplary embodiment 1) and FIG. 9E (exemplary embodiment 2) show the plot of $|\text{rot } \vec{A}|$ for a series of lenses with additions of 1.0, 2.0, 2.5, 3.0 and 3.5 dpt.

The plot of $|\text{rot } \vec{A}|$ in FIG. 9A is characterized by clearly pronounced maximums with values of more than 0.5 dpt/mm and steep flanks, but the plot of FIG. 9B is characterized by weakly pronounced maximums with values of less than 0.17 dpt/mm. The same thing is true of the plot in FIG. 9C where the maximums have values of less than 0.16 dpt/mm. Furthermore, the plot is almost like a plateau at −x values.

Figure 9E:
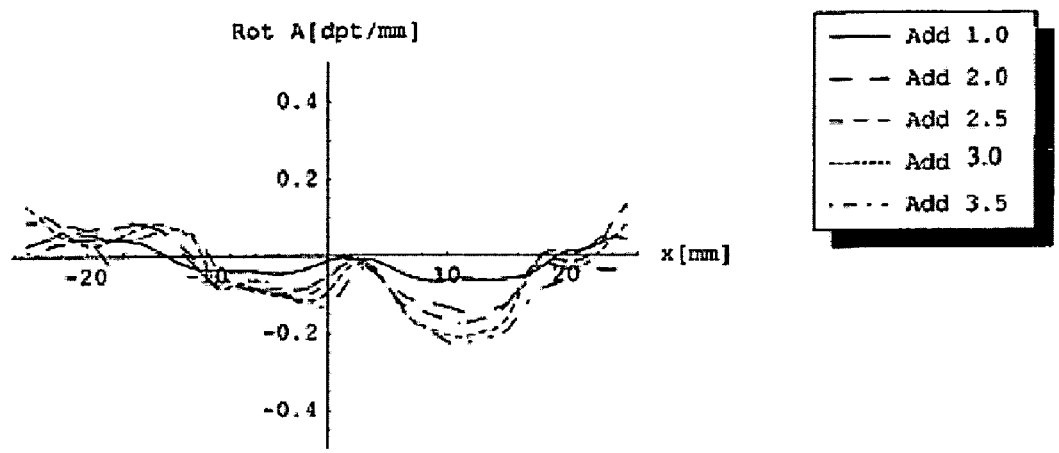
FIG. 9E is a plot of the absolute value of the rotation |rot $\vec{A}$| of the surface astigmatism of the front surface of a series of lenses according to exemplary embodiment 2 having additions of 1.0, 2.0, 2.5, 3.0 and 3.5 dpt in dpt/mm at a horizontal section y=−14 mm.

As FIGS. 9A through 9C show, rot $\vec{A}$ fluctuates much more in the prior art than in the case of the present invention. The quantity rot $\vec{A}$ is also scaled approximately linearly with the addition at y=−14 mm, as shown in FIG. 9D and FIG. 9E for a series of lenses according to exemplary embodiment 1 and exemplary embodiment 2, respectively, with different additions. The value of the maximum in particular is scaled linearly, namely for exemplary embodiment 1 according to the dependence:

$$|\text{rot } \vec{A}|_{max} \approx 0.08 \text{ addition/dpt} \cdot \text{dpt/mm}$$

and for exemplary embodiment 2 according to the dependence:

$$|\text{rot } \vec{A}|_{max} \approx 0.07 \text{ addition/dpt} \cdot \text{dpt/mm}.$$

Figure 10A:
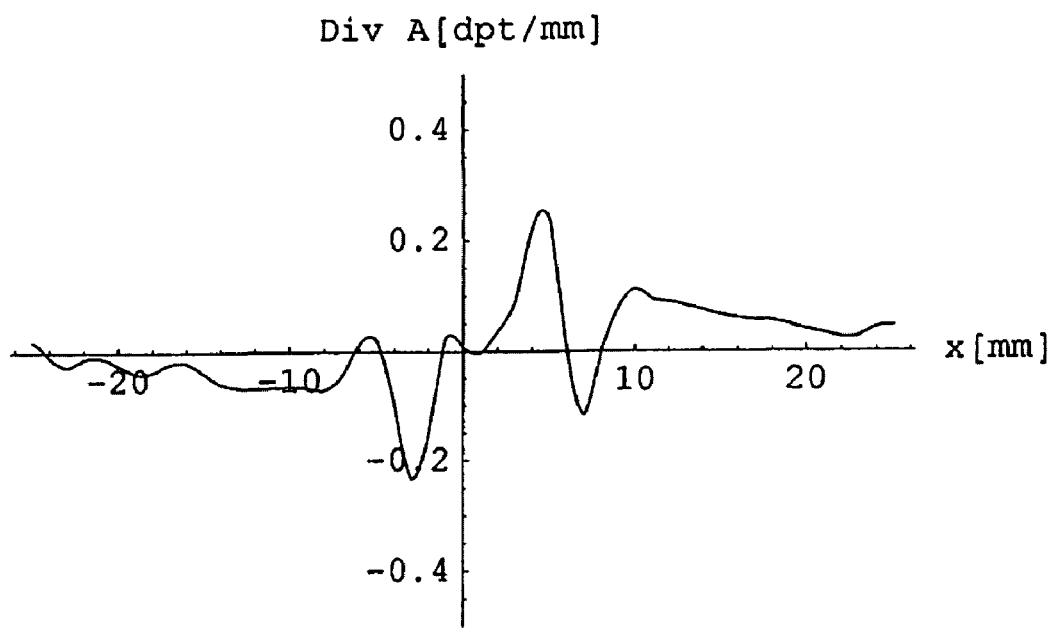
FIG. 10A is a plot of the divergence div $\vec{A}$ of the surface astigmatism of the front surface of a lens according to the state of the art in dpt/mm at a horizontal section y=0 mm.

FIGS. 10A through 10E show the plot of the divergence of the astigmatism div $\vec{A}$ in dpt/mm in the horizontal section at y=0 mm. As shown in FIG. 10A, the plot is characterized by clearly pronounced maximums and minimums of div $\vec{A}$ with steep flanks and with values of more than 0.25 dpt/mm and less than −0.25 dpt/mm. However, the maximum of div $\vec{A}$ has a value of less than 0.18 dpt/mm and the minimum has a value greater than −0.18 dpt/mm for exemplary embodiment 1. Exemplary embodiment 2 has even smaller values for the maximum and minimum. The maximum of div $\vec{A}$ in exemplary embodiment 2 is less than 0.11 dpt/mm and the minimum is greater than −0.11 dpt/mm.

Figure 10B:
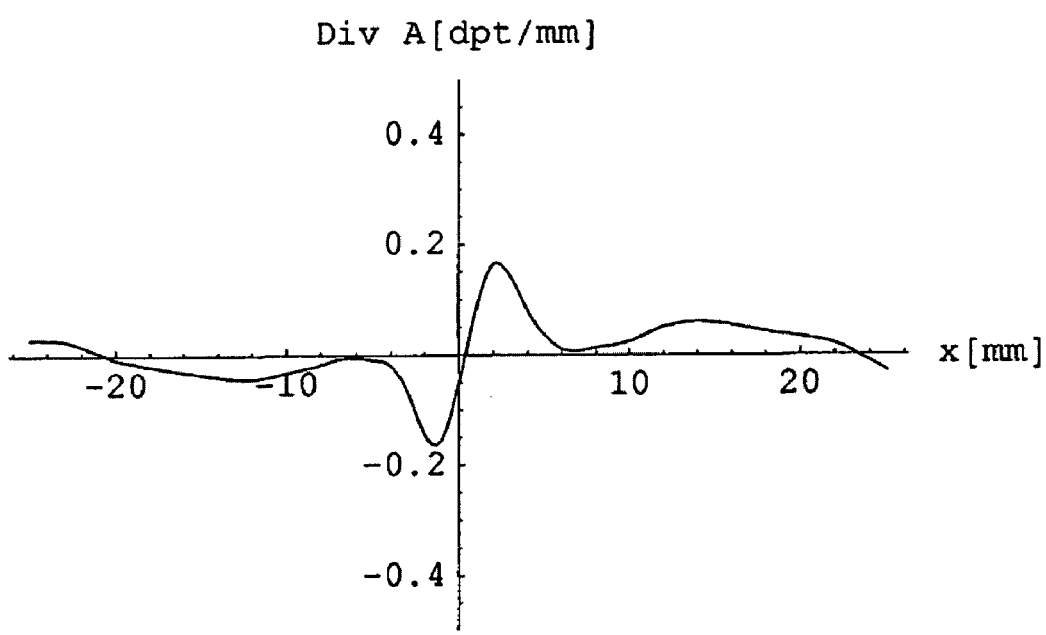
FIG. 10B is a plot of the divergence div $\vec{A}$ of the surface astigmatism of the front surface of a lens according to exemplary embodiment 1 in dpt/mm at a horizontal section y=0 mm.
Figure 10C:
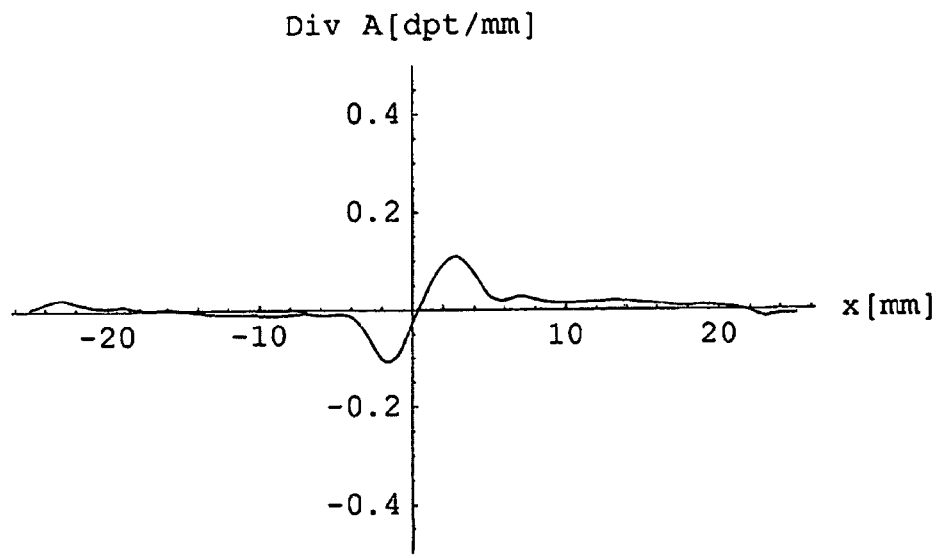
FIG. 10C is a plot of the divergence div $\vec{A}$ of the surface astigmatism of the front surface of a lens according exemplary embodiment 2 in dpt/mm at a horizontal section y=0 mm.

As shown in FIGS. 10A through 10C, the improvement from the art to the present invention is especially noteworthy with regard to the quantity div $\vec{A}$ at y=0 mm. An uneven behavior with multiple extremes and steep flanks and absolute values of more than 0.25 dpt/mm as is characteristic of the art (FIG. 10A), is replaced in exemplary embodiment 1, as shown in FIG. 10B by one maximum and one minimum with values of less 0.17 dpt/mm for $|x| \leq 5$ mm and a plateau-shaped tail with values of less than 0.06 dpt/mm. For exemplary embodiment 2, the absolute values of the extreme are even below 0.11 dpt/mm and the flanks do not exceed the absolute value of 0.011 dpt/mm (FIG. 10C).

Figure 10D:
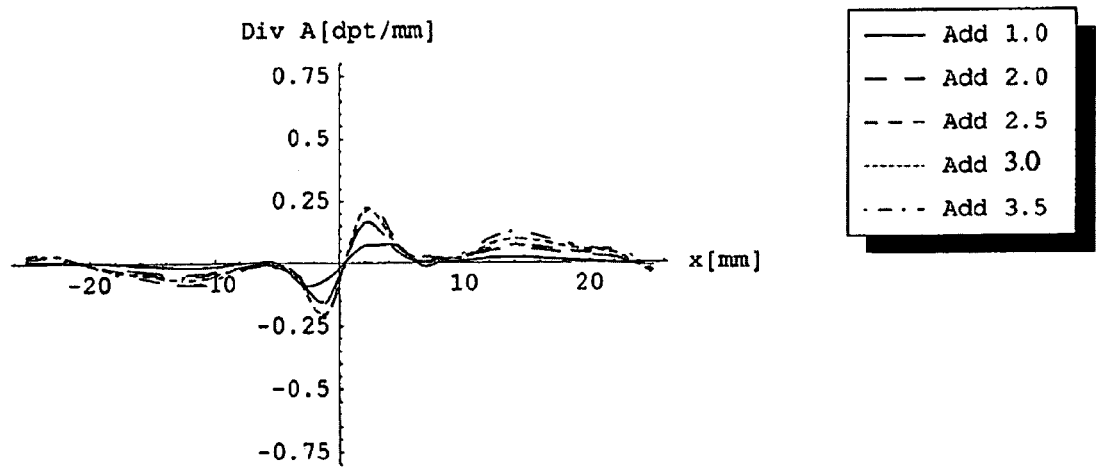
FIG. 10D is a plot of the divergence div $\vec{A}$ of the surface astigmatism of the front surface of a series of lenses according to exemplary embodiment 1 having additions of 1.0, 2.0, 2.5, 3.0 and 3.5 dpt in dpt/mm at a horizontal section y=0 mm.
Figure 10E:
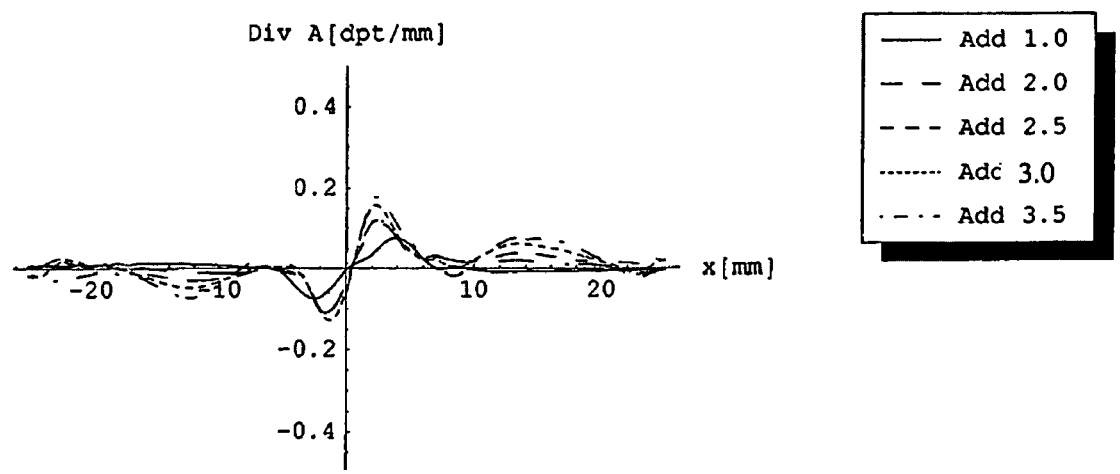
FIG. 10E is a plot of the divergence div $\vec{A}$ of the surface astigmatism of the front surface having additions of 1.0, 2.0, 2.5, 3.0 and 3.5 dpt in dpt/mm at a horizontal section y=0 mm.

The quantity div $\vec{A}$ is not scaled linearly at y=0 mm but is consistent with the addition, as illustrated in FIG. 10D (exemplary embodiment 1) and FIG. 10E (exemplary embodiment 2) for inventive lenses with addition of 1.0, 2.0, 2.5, 3.0 and 3.5 dpt. The value of the maximum is scaled according to the following dependence for exemplary embodiment 1:

$$(\text{div } \vec{A})_{max} \approx (0.08 \text{ addition/dpt} + 0.03) \text{ dpt/mm}$$

and the value of the minimum is scaled according to:

$$(\text{div } \vec{A})_{min} \approx (-0.05 \text{ addition/dpt} - 0.08) \text{ dpt/mm}.$$

For exemplary embodiment 2 it holds that:

$$(\text{div } \vec{A})_{max} \approx (0.042 \text{ addition/dpt} + 0.029) \text{ dpt/mm}$$

$$(\text{div } \vec{A})_{min} \approx (-0.022 \text{ addition/dpt} - 0.06) \text{ dpt/mm}.$$

Figure 11A:
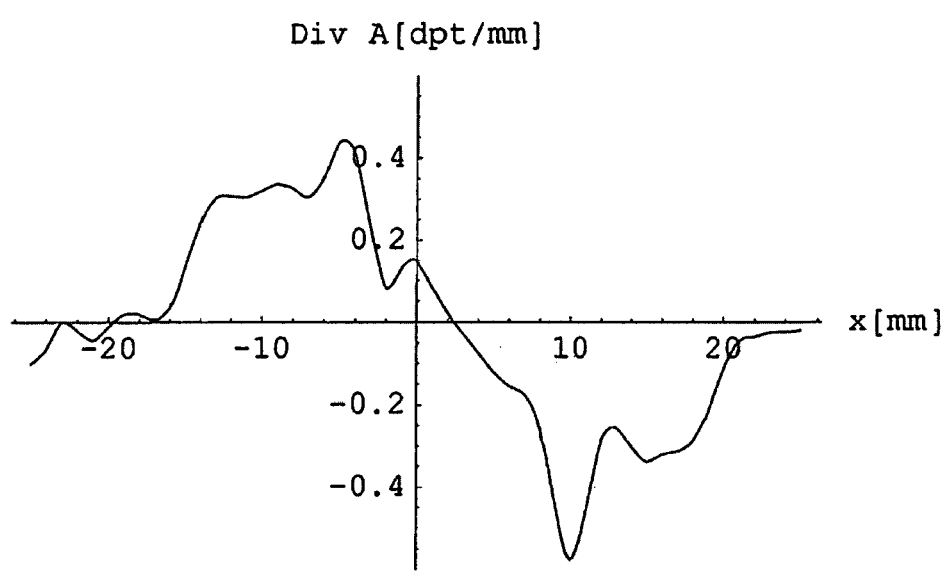
FIG. 11A is a plot of the divergence div $\vec{A}$ of the surface astigmatism of the front surface of a lens according to the art in dpt/mm at a horizontal section y=−14 mm.
Figure 11B:
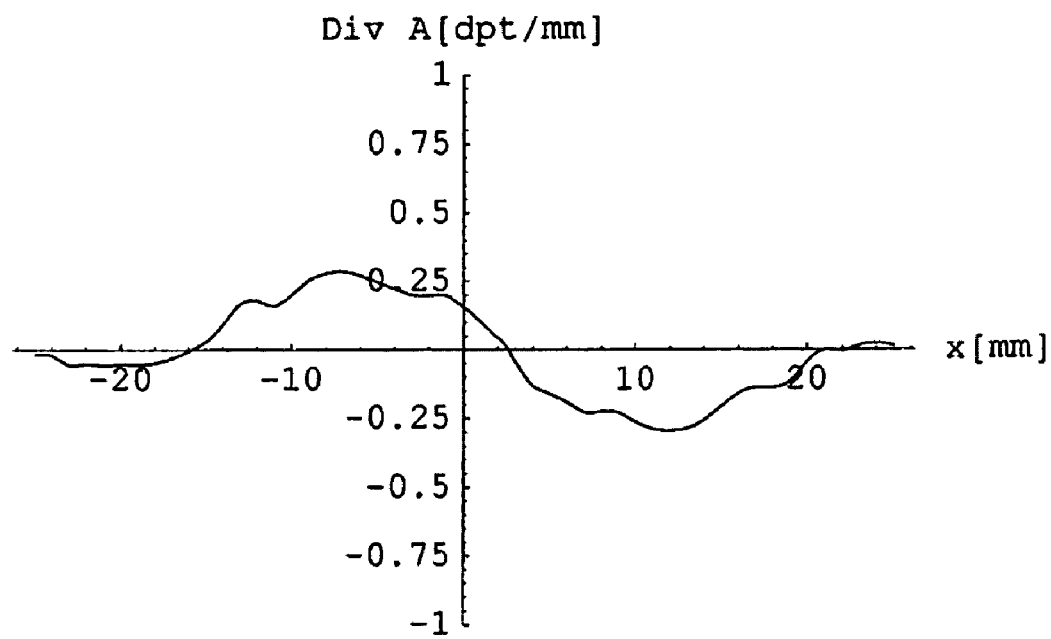
FIG. 11B is a plot of the divergence div $\vec{A}$ of the surface astigmatism of the front surface of a lens according to exemplary embodiment 1 in dpt/mm at a horizontal section y=−14 mm.
Figure 11C:
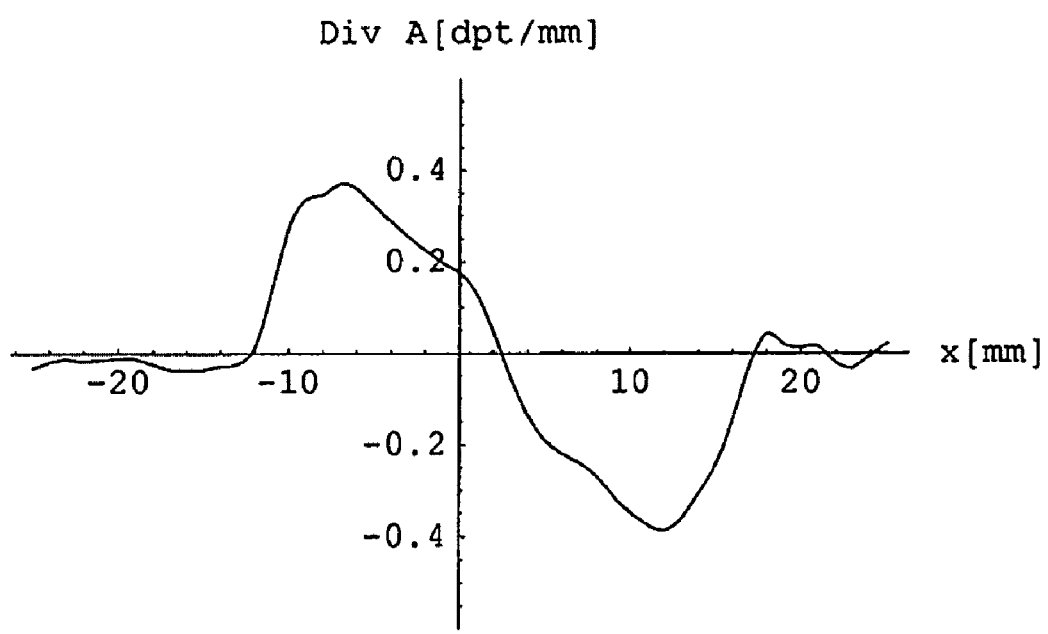
FIG. 11C is a plot of the divergence div $\vec{A}$ of the surface astigmatism of the front surface in dpt/mm at a horizontal section y=−14 mm according to exemplary embodiment 2.

FIGS. 11A through 11E show the plot of the divergence of the astigmatism div $\vec{A}$ in dpt/mm in the horizontal section at y=−14 mm. As shown in FIG. 11A, the plot of the divergence at y=−14 mm is characterized by clearly pronounced maximums and minimums with steep flanks and values of more than 0.45 dpt/mm and less than −0.6 dpt/mm. However, the plot of the divergence of the inventive exemplary embodiments is much smoother, whereby for exemplary embodiment 1 the maximum is below a value of 0.3 dpt/mm and the minimum is above a value of −0.35 dpt/mm. For exemplary embodiment 2 the maximum has a value of 0.4 dpt/mm the minimum has a value of more than −0.4 dpt/mm.

Figure 11D:
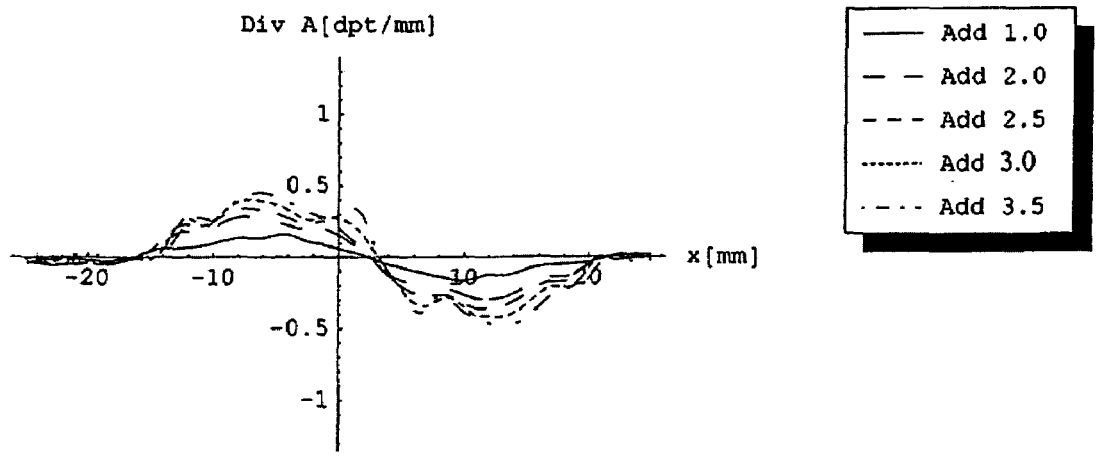
FIG. 11D is a plot of the divergence div $\vec{A}$ of the surface astigmatism of the front surface of a series of lenses according to exemplary embodiment 1 having additions of 1.0, 2.0, 2.5, 3.0 and 3.5 dpt in dpt/mm at a horizontal section y=−14 mm.
Figure 11E:
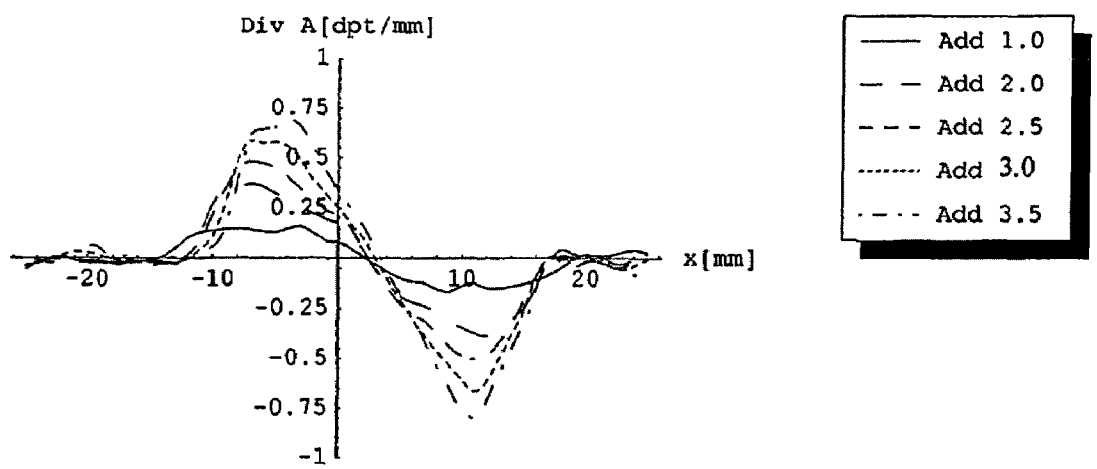
FIG. 11E is a plot of the divergence div $\vec{A}$ of the surface astigmatism of the front surface of a series of lenses according to exemplary embodiment 2 having additions of 1.0, 2.0, 2.5, 3.0 and 3.5 dpt in dpt/mm at a horizontal section y=−14 mm.

FIG. 11D (exemplary embodiment 1) and FIG. 11E (exemplary embodiment 2) show the plot of the divergence of the astigmatism for a series of lenses with additions of 1.0, 2.0, 2.5, 3.0 and 3.5 dpt. As in a horizontal section at y=0 mm, the quantity div $\vec{A}$ is also scaled similarly at y=−14 mm for exemplary embodiment 1 with the addition as shown in FIG. 11D for the additions 1.0, 2.0, 2.5, 3.0 and 3.5 dpt. For exemplary embodiment 2 the relationship is linear (see FIG. 11E) but leads to higher absolute values of div $\vec{A}$ than in the case of exemplary embodiment 1. For the maximum of div $\vec{A}$ in exemplary embodiment 1, the following holds:

$$(\text{div } \vec{A})_{max} \approx (0.12 \text{ addition/dpt} + 0.06) \text{ dpt/mm},$$

but for the minimum:

$$(\text{div } \vec{A})_{min} \approx (-0.13 \text{ addition/dpt} - 0.05) \text{ dpt/mm}.$$

For exemplary embodiment 2 it holds that:

$$(\text{div } \vec{A})_{max} \approx 0.2 \text{ addition/dpt} \cdot \text{dpt/mm}$$

$$(\text{div } \vec{A})_{min} \approx -0.22 \text{ addition/dpt} \cdot \text{dpt/mm}.$$

TABLE 3A

| X/Y | −30.0 | −27.5 | −25.0 | −22.5 | −20.0 | −17.5 | −15.0 | −12.5 | −10.0 | −7.5 | −5.0 | −2.5 | 0.0 |
|---|---|---|---|---|---|---|---|---|---|---|---|---|---|
| 30.0 | 7.01201 | 6.43297 | 5.90677 | 5.43260 | 5.00970 | 4.63738 | 4.31515 | 4.04262 | 3.81937 | 3.64506 | 3.51945 | 3.44238 | 3.41370 |
| 27.5 | 6.45126 | 5.87398 | 5.34940 | 4.87673 | 4.45520 | 4.08414 | 3.76295 | 3.49122 | 3.26854 | 3.09458 | 2.96913 | 2.89199 | 2.86301 |
| 25.0 | 5.94229 | 5.36642 | 4.84311 | 4.37160 | 3.95115 | 3.58108 | 3.26080 | 2.98982 | 2.76771 | 2.59413 | 2.46884 | 2.39164 | 2.36240 |
| 22.5 | 5.48467 | 4.90984 | 4.38746 | 3.91676 | 3.49705 | 3.12769 | 2.80810 | 2.53778 | 2.31621 | 2.14301 | 2.01789 | 1.94067 | 1.91121 |
| 20.0 | 5.07803 | 4.50393 | 3.98210 | 3.51184 | 3.09249 | 2.72352 | 2.40439 | 2.13453 | 1.91342 | 1.74059 | 1.61569 | 1.53850 | 1.50886 |
| 17.5 | 4.72215 | 4.14848 | 3.62683 | 3.15656 | 2.73718 | 2.36829 | 2.04933 | 1.77972 | 1.55890 | 1.38637 | 1.26170 | 1.18459 | 1.15483 |
| 15.0 | 4.41704 | 3.84349 | 3.32158 | 2.85086 | 2.43108 | 2.06188 | 1.74274 | 1.47309 | 1.25235 | 1.07998 | 0.95551 | 0.87851 | 0.84867 |
| 12.5 | 4.16294 | 3.58917 | 3.06654 | 2.59496 | 2.17438 | 1.80444 | 1.48467 | 1.21458 | 0.99358 | 0.82115 | 0.69675 | 0.61985 | 0.58998 |
| 10.0 | 3.96016 | 3.38571 | 2.86204 | 2.38928 | 1.96748 | 1.59637 | 1.27550 | 1.00441 | 0.78266 | 0.60977 | 0.48519 | 0.40831 | 0.37843 |
| 7.5 | 3.80967 | 3.23383 | 2.70868 | 2.23440 | 1.81101 | 1.43827 | 1.11581 | 0.84320 | 0.62004 | 0.44599 | 0.32070 | 0.24362 | 0.21371 |
| 5.0 | 3.71317 | 3.13537 | 2.60807 | 2.13164 | 1.70609 | 1.33117 | 1.00651 | 0.73172 | 0.50645 | 0.33048 | 0.20363 | 0.12573 | 0.09567 |
| 2.5 | 3.67289 | 3.09268 | 2.56284 | 2.08367 | 1.65527 | 1.27741 | 0.94974 | 0.67185 | 0.44341 | 0.26429 | 0.13470 | 0.05500 | 0.02441 |
| 0.0 | 3.69136 | 3.10822 | 2.57551 | 2.09317 | 1.66132 | 1.27983 | 0.94829 | 0.66625 | 0.43335 | 0.24959 | 0.11561 | 0.03249 | 0.00048 |
| −2.5 | 3.77113 | 3.18444 | 2.64841 | 2.16252 | 1.72669 | 1.34085 | 1.00453 | 0.71718 | 0.47843 | 0.28849 | 0.14858 | 0.06048 | 0.02564 |
| −5.0 | 3.91476 | 3.32393 | 2.78382 | 2.29382 | 1.85346 | 1.46248 | 1.12048 | 0.82676 | 0.58095 | 0.38359 | 0.23657 | 0.14245 | 0.10365 |
| −7.5 | 4.12320 | 3.52790 | 2.98338 | 2.48872 | 2.04319 | 1.64635 | 1.29779 | 0.99689 | 0.74323 | 0.53769 | 0.38294 | 0.28243 | 0.23934 |
| −10.0 | 4.39668 | 3.79639 | 3.24684 | 2.74690 | 2.29575 | 1.89268 | 1.53713 | 1.22838 | 0.96640 | 0.75255 | 0.59019 | 0.48365 | 0.43671 |
| −12.5 | 4.73486 | 4.12888 | 3.57342 | 3.06742 | 2.60998 | 2.20026 | 1.83740 | 1.52047 | 1.25014 | 1.02850 | 0.85958 | 0.74823 | 0.69854 |
| −15.0 | 5.13735 | 4.52477 | 3.96243 | 3.44945 | 2.98485 | 2.56766 | 2.19689 | 1.87204 | 1.59445 | 1.36663 | 1.19286 | 1.07812 | 1.02670 |
| −17.5 | 5.60350 | 4.98305 | 4.41272 | 3.89182 | 3.41930 | 2.99417 | 2.61592 | 2.28437 | 2.00117 | 1.76898 | 1.59198 | 1.47510 | 1.42263 |
| −20.0 | 6.13248 | 5.50293 | 4.92400 | 4.39476 | 3.91409 | 3.48151 | 3.09679 | 2.75975 | 2.47238 | 2.23735 | 2.05851 | 1.94042 | 1.88720 |
| −22.5 | 6.72414 | 6.08520 | 5.49741 | 4.95974 | 4.47146 | 4.03220 | 3.64162 | 3.30038 | 3.00994 | 2.77320 | 2.59354 | 2.47498 | 2.42147 |
| −25.0 | 7.38002 | 6.73144 | 6.13480 | 5.58921 | 5.09398 | 4.64877 | 4.25345 | 3.90837 | 3.61559 | 3.37784 | 3.19806 | 3.07971 | 3.02646 |
| −27.5 | 8.10252 | 7.44403 | 6.83876 | 6.28578 | 5.78429 | 5.33370 | 4.93397 | 4.58577 | 4.29112 | 4.05266 | 3.87311 | 3.75547 | 3.70299 |
| −30.0 | 8.89531 | 8.22653 | 7.61273 | 7.05260 | 6.54507 | 6.08942 | 5.68566 | 5.33480 | 5.03857 | 4.79945 | 4.62007 | 4.50324 | 4.45190 |

| X/Y | 2.5 | 5.0 | 7.5 | 10.0 | 12.5 | 15.0 | 17.5 | 20.0 | 22.5 | 25.0 | 27.5 | 30.0 |
|---|---|---|---|---|---|---|---|---|---|---|---|---|
| 30.0 | 3.43327 | 3.50112 | 3.61754 | 3.78293 | 3.99778 | 4.26263 | 4.57809 | 4.94480 | 5.36347 | 5.83487 | 6.35980 | 6.93907 |
| 27.5 | 2.88204 | 2.94911 | 3.06456 | 3.22882 | 3.44240 | 3.70590 | 4.01992 | 4.38516 | 4.80234 | 5.27222 | 5.79559 | 6.37326 |
| 25.0 | 2.38093 | 2.44730 | 2.56189 | 2.72513 | 2.93759 | 3.19989 | 3.51269 | 3.87670 | 4.29266 | 4.76133 | 5.28348 | 5.85992 |
| 22.5 | 1.92930 | 1.99506 | 2.10889 | 2.27127 | 2.48279 | 2.74411 | 3.05592 | 3.41899 | 3.83405 | 4.30185 | 4.82314 | 5.39869 |
| 20.0 | 1.52657 | 1.59181 | 1.70500 | 1.86667 | 2.07746 | 2.33806 | 2.64920 | 3.01168 | 3.42622 | 3.89354 | 4.41436 | 4.98938 |
| 17.5 | 1.17223 | 1.23702 | 1.34969 | 1.51085 | 1.72117 | 1.98136 | 2.29221 | 2.65451 | 3.06899 | 3.53631 | 4.05706 | 4.63194 |
| 15.0 | 0.86582 | 0.93024 | 1.04255 | 1.20343 | 1.41359 | 1.67379 | 1.98481 | 2.34742 | 2.76234 | 3.23019 | 3.75137 | 4.32646 |
| 12.5 | 0.60693 | 0.67110 | 0.78325 | 0.94416 | 1.15462 | 1.41536 | 1.72712 | 2.09060 | 2.50646 | 2.97531 | 3.49742 | 4.07311 |
| 10.0 | 0.39525 | 0.45929 | 0.57161 | 0.73307 | 0.94446 | 1.20641 | 1.51953 | 1.88444 | 2.30178 | 2.77209 | 3.29556 | 3.87253 |
| 7.5 | 0.23049 | 0.29470 | 0.40778 | 0.57056 | 0.78370 | 1.04756 | 1.36270 | 1.72967 | 2.14906 | 2.62137 | 3.14701 | 3.72608 |
| 5.0 | 0.11254 | 0.17752 | 0.29230 | 0.45743 | 0.67321 | 0.93990 | 1.25788 | 1.62768 | 2.04987 | 2.52502 | 3.05363 | 3.63552 |
| 2.5 | 0.04163 | 0.10826 | 0.22601 | 0.39496 | 0.61483 | 0.88556 | 1.20746 | 1.58106 | 2.00695 | 2.48576 | 3.01789 | 3.60302 |
| 0.0 | 0.01837 | 0.08788 | 0.21031 | 0.38495 | 0.61068 | 0.88695 | 1.21398 | 1.59236 | 2.02279 | 2.50596 | 3.04211 | 3.63084 |
| −2.5 | 0.04431 | 0.11771 | 0.24619 | 0.42836 | 0.66194 | 0.94550 | 1.27910 | 1.66340 | 2.09927 | 2.58747 | 3.12811 | 3.72121 |
| −5.0 | 0.12251 | 0.20000 | 0.33515 | 0.52591 | 0.76895 | 1.06163 | 1.40343 | 1.79501 | 2.23746 | 2.73156 | 3.27749 | 3.87579 |
| −7.5 | 0.25746 | 0.33838 | 0.47979 | 0.67894 | 0.93194 | 1.23494 | 1.58645 | 1.98688 | 2.43737 | 2.93857 | 3.49084 | 4.09522 |
| −10.0 | 0.45377 | 0.53676 | 0.68318 | 0.88953 | 1.15173 | 1.46512 | 1.82711 | 2.23739 | 2.69683 | 3.20629 | 3.76642 | 4.37838 |
| −12.5 | 0.71470 | 0.79855 | 0.94818 | 1.15987 | 1.42954 | 1.75226 | 2.12447 | 2.54487 | 3.01371 | 3.53215 | 4.10126 | 4.72211 |
| −15.0 | 1.04225 | 1.12639 | 1.27772 | 1.49296 | 1.76798 | 2.09792 | 2.47879 | 2.90874 | 3.38722 | 3.91521 | 4.49402 | 5.12452 |
| −17.5 | 1.43771 | 1.52195 | 1.67420 | 1.89161 | 2.17018 | 2.50527 | 2.89290 | 3.33095 | 3.81837 | 4.35581 | 4.94447 | 5.58532 |
| −20.0 | 1.90190 | 1.98622 | 2.13909 | 2.35779 | 2.63857 | 2.97718 | 3.36998 | 3.81475 | 4.31014 | 4.85633 | 5.45418 | 6.10517 |
| −22.5 | 2.43600 | 2.52033 | 2.67349 | 2.89288 | 3.17496 | 3.51598 | 3.91280 | 4.36323 | 4.86571 | 5.41989 | 6.02648 | 6.68710 |
| −25.0 | 3.04117 | 3.12543 | 3.27850 | 3.49807 | 3.78087 | 4.12366 | 4.52375 | 4.97906 | 5.48813 | 6.05011 | 6.66536 | 7.33549 |
| −27.5 | 3.71829 | 3.80244 | 3.95512 | 4.17451 | 4.45784 | 4.80218 | 5.20515 | 5.66492 | 6.18020 | 6.75011 | 7.37454 | 8.05484 |
| −30.0 | 4.46795 | 4.55223 | 4.70446 | 4.92368 | 5.20766 | 5.55367 | 5.95950 | 6.42364 | 6.94508 | 7.52312 | 8.15756 | 8.84917 |

TABLE 3B

| X/Y | −30.0 | −27.5 | −25.0 | −22.5 | −20.0 | −17.5 | −15.0 | −12.5 | −10.0 | −7.5 | −5.0 | −2.5 | 0.0 |
|---|---|---|---|---|---|---|---|---|---|---|---|---|---|
| 30.0 | 7.07685 | 6.50602 | 5.98575 | 5.51551 | 5.09488 | 4.72350 | 4.40110 | 4.12747 | 3.90253 | 3.72631 | 3.59880 | 3.51939 | 3.48743 |
| 27.5 | 6.50679 | 5.93804 | 5.41954 | 4.95076 | 4.53130 | 4.16085 | 3.83915 | 3.56607 | 3.34150 | 3.16540 | 3.03781 | 2.95833 | 2.92640 |
| 25.0 | 5.98922 | 5.42224 | 4.90554 | 4.43761 | 4.01910 | 3.64936 | 3.32820 | 3.05553 | 2.83124 | 2.65525 | 2.52756 | 2.44798 | 2.41607 |
| 22.5 | 5.52352 | 4.95799 | 4.44212 | 3.97547 | 3.55767 | 3.18845 | 2.86768 | 2.59527 | 2.37117 | 2.19527 | 2.06750 | 1.98777 | 1.95582 |
| 20.0 | 5.10919 | 4.54479 | 4.02982 | 3.56384 | 3.14652 | 2.77762 | 2.45705 | 2.18478 | 1.96074 | 1.78486 | 1.65703 | 1.57716 | 1.54510 |
| 17.5 | 4.74581 | 4.18223 | 3.66786 | 3.20229 | 2.78520 | 2.41641 | 2.09587 | 1.82357 | 1.59950 | 1.42357 | 1.29566 | 1.21567 | 1.18351 |
| 15.0 | 4.43296 | 3.86999 | 3.35594 | 2.89049 | 2.47338 | 2.10446 | 1.78373 | 1.51124 | 1.28701 | 1.11097 | 0.98298 | 0.90291 | 0.87065 |
| 12.5 | 4.17021 | 3.60775 | 3.09386 | 2.62830 | 2.21089 | 1.84160 | 1.52046 | 1.24755 | 1.02296 | 0.84667 | 0.71856 | 0.63847 | 0.60615 |
| 10.0 | 3.95747 | 3.39533 | 2.88152 | 2.41570 | 1.99783 | 1.62794 | 1.30611 | 1.03251 | 0.80728 | 0.83052 | 0.50214 | 0.42196 | 0.38965 |
| 7.5 | 3.79556 | 3.23331 | 2.71924 | 2.25304 | 1.83454 | 1.46384 | 1.14105 | 0.86640 | 0.84018 | 0.48259 | 0.33387 | 0.25328 | 0.22092 |
| 5.0 | 3.68570 | 3.12283 | 2.60805 | 2.14099 | 1.72168 | 1.34999 | 1.02603 | 0.75020 | 0.52235 | 0.34339 | 0.21359 | 0.13240 | 0.09991 |
| 2.5 | 3.62990 | 3.06579 | 2.54974 | 2.08141 | 1.66084 | 1.28786 | 0.96243 | 0.68470 | 0.45503 | 0.27393 | 0.14194 | 0.05951 | 0.02653 |
| 0.0 | 3.63076 | 3.06489 | 2.54712 | 2.07716 | 1.65493 | 1.28030 | 0.95309 | 0.67320 | 0.44076 | 0.25628 | 0.12074 | 0.03543 | 0.00105 |
| −2.5 | 3.69140 | 3.12333 | 2.60340 | 2.13144 | 1.70726 | 1.33062 | 1.00116 | 0.71840 | 0.48206 | 0.29265 | 0.15183 | 0.06189 | 0.02469 |
| −5.0 | 3.81473 | 3.24419 | 2.72185 | 2.24760 | 1.82115 | 1.44193 | 1.10928 | 0.82249 | 0.58103 | 0.38539 | 0.23799 | 0.14221 | 0.10103 |
| −7.5 | 4.00175 | 3.42901 | 2.90460 | 2.42813 | 1.99898 | 1.61636 | 1.27944 | 0.98743 | 0.73985 | 0.53723 | 0.38263 | 0.28055 | 0.23509 |

TABLE 3B-continued

| | | | | | | | | | | | | |
|---|---|---|---|---|---|---|---|---|---|---|---|---|
| −10.0 | 4.25267 | 3.67813 | 3.15172 | 2.67277 | 2.24042 | 1.85375 | 1.51200 | 1.21440 | 0.96026 | 0.75025 | 0.58841 | 0.48032 | 0.43108 |
| −12.5 | 4.56762 | 3.99126 | 3.46248 | 2.98040 | 2.54420 | 2.15303 | 1.80624 | 1.50298 | 1.24216 | 1.02488 | 0.85655 | 0.74372 | 0.69181 |
| −15.0 | 4.94702 | 4.36806 | 3.83608 | 3.35016 | 2.90953 | 2.51353 | 2.16138 | 1.85211 | 1.58483 | 1.36165 | 1.18858 | 1.07254 | 1.01907 |
| −17.5 | 5.39017 | 4.80762 | 4.27161 | 3.78129 | 3.33580 | 2.93453 | 2.57676 | 2.26179 | 1.98939 | 1.76218 | 1.58619 | 1.46832 | 1.41413 |
| −20.0 | 5.89620 | 5.30922 | 4.76859 | 4.27332 | 3.82264 | 3.41605 | 3.05303 | 2.73342 | 2.45745 | 2.22794 | 2.05063 | 1.93203 | 1.87760 |
| −22.5 | 6.46489 | 5.87267 | 5.32677 | 4.82629 | 4.37055 | 3.95901 | 3.59165 | 3.26856 | 2.99043 | 2.76002 | 2.58265 | 2.46421 | 2.40997 |
| −25.0 | 7.09666 | 6.49805 | 5.94644 | 5.44081 | 4.98018 | 4.56451 | 4.19408 | 3.86893 | 3.58978 | 3.35937 | 3.18269 | 3.06514 | 3.01162 |
| −27.5 | 7.79271 | 7.18673 | 6.62886 | 6.11786 | 5.65292 | 5.23424 | 4.86207 | 4.53601 | 4.25651 | 4.02667 | 3.85116 | 3.73490 | 3.68238 |
| −30.0 | 8.55550 | 7.94149 | 7.37659 | 6.86006 | 6.39146 | 5.97079 | 5.59766 | 5.27113 | 4.99167 | 4.76277 | 4.58872 | 4.47398 | 4.42258 |

| X/Y | 2.5 | 5.0 | 7.5 | 10.0 | 12.5 | 15.0 | 17.5 | 20.0 | 22.5 | 25.0 | 27.5 | 30.0 |
|---|---|---|---|---|---|---|---|---|---|---|---|---|
| 30.0 | 3.50292 | 3.56618 | 3.67806 | 3.83929 | 4.04997 | 4.31020 | 4.62019 | 4.98011 | 5.39018 | 5.85068 | 6.36195 | 6.92447 |
| 27.5 | 2.94190 | 3.00511 | 3.11698 | 3.27808 | 3.48841 | 3.74809 | 4.05734 | 4.41634 | 4.82533 | 5.28454 | 5.79435 | 6.35524 |
| 25.0 | 2.43150 | 2.49474 | 2.60665 | 2.76762 | 2.97763 | 3.23687 | 3.54555 | 3.90389 | 4.31205 | 4.77031 | 5.27903 | 5.83867 |
| 22.5 | 1.97117 | 2.03453 | 2.14652 | 2.30730 | 2.51705 | 2.77598 | 3.08431 | 3.44223 | 3.84989 | 4.30755 | 4.81556 | 5.37433 |
| 20.0 | 1.56049 | 1.62398 | 1.73593 | 1.89656 | 2.10614 | 2.36496 | 2.67319 | 3.03099 | 3.43848 | 3.89591 | 4.40356 | 4.98177 |
| 17.5 | 1.19899 | 1.26251 | 1.37437 | 1.53492 | 1.74453 | 2.00348 | 2.31190 | 2.66990 | 3.07757 | 3.53508 | 4.04268 | 4.60064 |
| 15.0 | 0.88614 | 0.94962 | 1.06145 | 1.22211 | 1.43199 | 1.69134 | 2.00025 | 2.35877 | 2.76692 | 3.22483 | 3.73267 | 4.29065 |
| 12.5 | 0.62156 | 0.68499 | 0.79695 | 0.95793 | 1.16837 | 1.42845 | 1.73817 | 2.09752 | 2.50649 | 2.96507 | 3.47336 | 4.03150 |
| 10.0 | 0.40500 | 0.46847 | 0.58074 | 0.74237 | 0.95373 | 1.21492 | 1.52583 | 1.88634 | 2.29636 | 2.75583 | 3.26474 | 3.82330 |
| 7.5 | 0.23630 | 0.29997 | 0.41289 | 0.57561 | 0.78841 | 1.05119 | 1.36368 | 1.72567 | 2.13702 | 2.59758 | 3.10754 | 3.66708 |
| 5.0 | 0.11538 | 0.17964 | 0.29380 | 0.45830 | 0.67318 | 0.93807 | 1.25255 | 1.61634 | 2.02930 | 2.49152 | 3.00309 | 3.56422 |
| 2.5 | 0.04227 | 0.10781 | 0.22421 | 0.39155 | 0.60939 | 0.87708 | 1.19408 | 1.56013 | 1.97524 | 2.43963 | 2.95341 | 3.51677 |
| 0.0 | 0.01724 | 0.08515 | 0.20546 | 0.37738 | 0.59960 | 0.87103 | 1.19117 | 1.55999 | 1.97776 | 2.44477 | 2.96122 | 3.52726 |
| −2.5 | 0.04132 | 0.11282 | 0.23878 | 0.41737 | 0.64590 | 0.92251 | 1.24673 | 1.61898 | 2.03988 | 2.50993 | 3.02948 | 3.59857 |
| −5.0 | 0.11759 | 0.19305 | 0.32558 | 0.51234 | 0.74913 | 1.03280 | 1.36270 | 1.73958 | 2.16439 | 2.63801 | 3.16105 | 3.73348 |
| −7.5 | 0.25069 | 0.32948 | 0.46824 | 0.66330 | 0.90942 | 1.20194 | 1.53949 | 1.92279 | 2.35286 | 2.83083 | 3.35757 | 3.93335 |
| −10.0 | 0.44554 | 0.52622 | 0.66990 | 0.87223 | 1.12742 | 1.42959 | 1.77592 | 2.16690 | 2.60366 | 3.08732 | 3.61876 | 4.19845 |
| −12.5 | 0.70541 | 0.78682 | 0.93354 | 1.14119 | 1.40406 | 1.71545 | 2.07077 | 2.46992 | 2.91427 | 3.40480 | 3.94213 | 4.52680 |
| −15.0 | 1.03217 | 1.11371 | 1.26191 | 1.47294 | 1.74124 | 2.06002 | 2.42380 | 2.83121 | 3.28355 | 3.78170 | 4.32588 | 4.91665 |
| −17.5 | 1.42697 | 1.50839 | 1.65711 | 1.86997 | 2.14170 | 2.46566 | 2.83623 | 3.25129 | 3.71125 | 4.21681 | 4.76841 | 5.36643 |
| −20.0 | 1.89043 | 1.97160 | 2.12035 | 2.33398 | 2.60752 | 2.93479 | 3.31048 | 3.73178 | 4.19840 | 4.71057 | 5.26915 | 5.87496 |
| −22.5 | 2.42289 | 2.50383 | 2.65235 | 2.86601 | 3.14021 | 3.46937 | 3.84858 | 4.27480 | 4.74698 | 5.26525 | 5.83047 | 6.44401 |
| −25.0 | 3.02482 | 3.10554 | 3.25358 | 3.46672 | 3.74088 | 4.07118 | 4.45292 | 4.88311 | 5.36035 | 5.88454 | 6.45649 | 7.07762 |
| −27.5 | 3.69595 | 3.77662 | 3.92417 | 4.13680 | 4.41085 | 4.74204 | 5.12614 | 5.55995 | 6.04208 | 6.57224 | 7.15106 | 7.77987 |
| −30.0 | 4.43675 | 4.51761 | 4.66491 | 4.87726 | 5.15143 | 5.48364 | 5.87017 | 6.30779 | 6.79480 | 7.33093 | 7.91672 | 8.55327 |

The invention claimed is:

1. Method for producing a progressive ophthalmic lens having at least one progressive surface, whereby the lens including a far vision part for seeing at great distances and having a far reference point, a near vision part for seeing at short distances and having a near reference point, and a progression zone situated between the far vision part and the near vision part, where the effect of the lens increases by an addition value along a principal line from a far reference point value to a near reference point value, comprising calculating and optimizing in producing the progressive lens so that at least one of an absolute value of the rotation |rot $\vec{A}$| and the divergence |div $\vec{A}$| of a vectorial astigmatism $\vec{A}$ is minimized, an absolute value |$\vec{A}$| of the vectorial astigmatism $\vec{A}$ is proportional to an absolute value of an astigmatism in a use position of the progressive lens or a surface astigmatism of the at least one progressive surface, and a direction of the vectorial astigmatism $\vec{A}$ is proportional to a cylinder axis of an astigmatism in the use position of the progressive lens or a surface astigmatism of the at least one progressive surface of the progressive lens.

2. Method as claimed in claim 1, wherein the calculating and optimizing are performed so that global maximum of the absolute value |div $\vec{A}$| of the divergence of the vectorial astigmatism $\vec{A}$ is outside the zone of good visual acuity of the lens in which the absolute value of the vectorial astigmatism |$\vec{A}$| is less than 0.6 dpt.

3. Method as claimed in claim 2, wherein the absolute value of the vectorial astigmatism |$\vec{A}$| is located in a peripheral area of the lens.

4. Method as claimed in claim 1, wherein, the calculating and optimizing are performed so that an x coordinate of a position of the global maximum of the absolute value |div $\vec{A}$| of the divergence of the vectorial astigmatism $\vec{A}$ is greater than 6.0 mm and the y coordinate is less than −8.5 mm, and wherein x is the horizontal axis and y is the vertical axis in the use position and the zero point x=0, y=0 is 4 mm below a centering point of the lens.

5. Method as claimed in claim 1, wherein, the calculating and optimizing are performed so that all extremes of the absolute value |div $\vec{A}$| of the divergence of the vectorial astigmatism $\vec{A}$ which exceed a value of (0.1/mm) times the addition for all progressive surfaces ≧2.0 dpt are outside of a range y≧−9 mm of the lens.

6. Method as claimed in claim 1, wherein the calculating and optimizing are performed so that the absolute value |rot $\vec{A}$| of the rotation of the vectorial astigmatism $\vec{A}$ in the near vision part and/or in the far vision part does not exceed a maximum value of |rot $\vec{A}|_{max}$≈0.25 addition/dpt*dpt/mm.

7. Method as claimed in claim 1, wherein the calculating and optimizing are performed so that the absolute value |rot $\vec{A}$| of the rotation of the vectorial astigmatism $\vec{A}$ in the horizontal section at y=−14 mm does not exceed a maximum value of |rot $\vec{A}|_{max}$≈0.115 addition/dpt*·dpt/mm.

8. Method as claimed in claim 7, wherein the maximum value of $|\text{rot } \vec{A}|_{max} \approx 0.08$ addition/dpt*dpt/mm.

9. Method as claimed in claim 1, wherein the calculating and optimizing are performed so that the absolute value $|\text{rot } \vec{A}|$ of the rotation of the vectorial astigmatism $\vec{A}$ in the horizontal section at y=+6 mm does not exceed a maximum value of $|\text{rot } \vec{A}|_{max} \approx 0.115$ addition/dpt·dpt/mm.

10. Method as claimed in claim 9, wherein $|\text{rot } \vec{A}|_{max} \approx 0.06$ addition/dpt*dpt/mm.

11. Method as claimed in claim 1, wherein the calculating and optimizing are performed so that in the far vision part between y=3 mm and y=5 mm there is a horizontal section y=const along which the absolute value $|\text{rot } \vec{A}|$ of the rotation of the vectorial astigmatism $\vec{A}$ increases monotonically from the principal line outward to a coordinate of |x|=16 mm.

12. Method as claimed in claim 1, wherein the calculating and optimizing are performed so that the divergence div $\vec{A}$ of the vectorial astigmatism $\vec{A}$ in the horizontal section at y=0 mm does not exceed a maximum value of $(\text{div } \vec{A})_{max} \approx (0.11 \text{ addition/dpt} + 0.03)$ dpt/mm.

13. Method as claimed in claim 12, wherein $(\text{div } \vec{A})_{max} \approx (0.11 \text{ addition/dpt} + 0.03)$ dpt/mm.

14. Method as claimed in claim 1, wherein the calculating and optimizing are performed so that the divergence div $\vec{A}$ of the vectorial astigmatism $\vec{A}$ in the horizontal section at y=0 mm does not drop below a minimum value of $(\text{div } \vec{A})_{min} \approx (-0.07 \text{ addition/dpt} - 0.11)$ dpt/mm.

15. Method as claimed in claim 12, wherein $(\text{div } \vec{A})_{max} \approx (0.08 \text{ addition/dpt} + 0.03)$ dpt/mm.

16. Method as claimed in claim 1, wherein the calculating and optimizing step is performed so that the divergence div $\vec{A}$ of the vectorial astigmatism $\vec{A}$ in the horizontal section at y=−14 mm does not exceed a maximum value of $(\text{div } \vec{A})_{max} \approx 0.12$ addition/dpt+0.06) dpt/mm.

17. Method as claimed in claim 1, wherein the calculating and optimizing are performed so that the divergence div $\vec{A}$ of the vectorial astigmatism $\vec{A}$ in the horizontal section at y=−14 mm does not drop below a minimum value of $(\text{div } \vec{A})_{min} \approx (-0.13 \text{ addition/dpt} - 0.05)$ dpt/mm.

18. Progressive ophthalmic lens having at least one progressive surface, comprising:
   a far vision designed for seeing at great distances and having a far reference point,
   a near vision part for seeing at short distances and having a near reference point, and
   a progression zone situated between the far vision part and the near vision part where the effect of the lens increases from an addition value along a principal line from a far reference point value to a near reference point value, wherein at least one of
   a global maximum of the absolute value $|\text{div } \vec{A}|$ of the divergence of a vectorial astigmatism $\vec{A}$ is outside a zone of good visual acuity of the lens in which the absolute value of vectorial astigmatism $|\vec{A}|$ is less than 0.6 dpt and is locatable in a peripheral area of the lens and
   an absolute value $|\text{rot } \vec{A}|$ of a rotation of the vectorial astigmatism $\vec{A}$ in the near vision part and/or in the far vision part does not exceed a maximum value of $|\text{rot } \vec{A}|_{max} \approx 0.25$ addition/dpt*·dpt/mm, and
   whereby the absolute value $|\vec{A}|$ of the vectorial astigmatism $\vec{A}$ is proportional to the absolute value of an astigmatism in a use position of the progressive lens or a surface astigmatism of the at least one progressive surface, and a direction of the vectorial astigmatism $\vec{A}$ is proportional to a cylinder axis of an astigmatism in the use position of the progressive lens or a surface astigmatism of the at least one progressive surface of the progressive lens.

19. Progressive lens as claimed in claim 18, wherein an x coordinate of a position of the global maximum of the absolute $\vec{A}$ value $|\text{div } \vec{A}|$ of the divergence of the vectorial astigmatism $\vec{A}$ is greater than 6.0 mm and the y coordinate is less than −8.5 mm, and wherein x is the horizontal axis and y is the vertical axis in the use position, and the zero point x=0, y=0 is located 4 millimeters below the centering point of the lens.

20. Progressive lens as claimed in claim 18, wherein for all progressive surfaces with addition $\geq 2.0$ dpt, all extremes of the absolute value $|\text{div } \vec{A}|$ of the divergence of the vectorial astigmatism $\vec{A}$ exceeding the value of (0.1/mm) times the addition are outside of the range y $\geq -9$ mm of the lens.

21. Progressive lens as claimed in claim 20, wherein Progressive ophthalmic lens having at least one progressive surface, comprising:
   a far vision designed for seeing at great distances and having a far reference point,
   a near vision part for seeing at short distances and having a near reference point, and
   a progression zone situated between the far vision part and the near vision part where the effect of the lens increases from an addition value along a principal line from a far reference point value to a near reference point value, wherein at least one of
   a global maximum of the absolute value $|\text{div } \vec{A}|$ of the divergence of a vectorial astigmatism $\vec{A}$ is outside a zone of good visual acuity of the lens in which the absolute value of vectorial astigmatism $|\vec{A}|$ is less than 0.6 dpt and is locatable in a peripheral area of the lens and
   an absolute value $|\text{rot } \vec{A}|$ of a rotation of the vectorial astigmatism $\vec{A}$ in the near vision part and/or in the far vision part does not exceed a maximum value of $|\text{rot } \vec{A}|_{max} \approx 0.25$ addition/dpt$\geq$·dpt/mm, and
   whereby the absolute value $|\vec{A}|$ of the vectorial astigmatism $\vec{A}$ is proportional to the absolute value of an astigmatism in a use position of the progressive lens, and the direction of the vectorial astigmatism $\vec{A}$ is proportional to a cylinder axis of an astigmatism in the use position of the progressive lens or a surface astigmatism of the at least one progressive surface of the progressive lens.

22. Progressive lens as claimed in claim 18, wherein the absolute value $|\text{rot } \vec{A}|$ of the rotation of the vectorial astigmatism $\vec{A}$ in the horizontal section at y=−14 mm does not exceed a maximum value of $|\text{rot } \vec{A}|_{max} \approx 0.115$ addition/dpt·dpt/mm, preferably $|\text{rot } \vec{A}|_{max} \approx 0.08$ addition/dpt*·dpt/mm.

23. Progressive lens as claimed in claim 22, wherein $|\text{rot } \vec{A}|_{max} \approx 0.08$ addition/dpt*·dpt/mm.

24. Progressive lens as claimed in claim 18, wherein the absolute value $|\text{rot } \vec{A}|$ of the rotation of the vectorial astigmatism $\vec{A}$ in the horizontal section at y=+6 mm does not exceed a maximum value of $|\text{rot } \vec{A}|_{max} \approx 0.115$ addition/dpt*·dpt/mm.

25. Progressive lens as claimed in claim 24, wherein $|\text{rot } \vec{A}|_{max} \approx 0.06$ addition/dpt*·dpt/mm.

26. Progressive lens as claimed in claim 18, wherein in the far vision part between y=3 mm and y=5 mm there is a horizontal section y=const along which the absolute value $|\text{rot } \vec{A}|$ of the rotation of the vectorial astigmatism $\vec{A}$ increases monotonically from the principal line outward to a coordinate of |x|=16 mm.

27. Progressive lens as claimed in claim 18, wherein the divergence div $\vec{A}$ of the vectorial astigmatism $\vec{A}$ in the horizontal section at y=0 mm does not exceed a maximum value of $(\text{div } \vec{A})_{max} \approx (0.11 \text{ addition/dpt} + 0.03)$ dpt/mm.

28. Progressive lens as claimed in claim 18, wherein $(\text{div } \vec{A})_{max} \approx (0.08 \text{ addition/dpt} + 0.03)$ dpt/mm.

29. Progressive lens as claimed in claim 18, wherein the divergence div $\vec{A}$ of the vectorial astigmatism $\vec{A}$ in the horizontal section at y=0 mm does not drop below a minimum value of $(\text{div } \vec{A})_{min} \approx (-0.07 \text{ addition/dpt} - 0.11)$ dpt/mm.

30. Progressive lens as claimed in claim 29, wherein $(\text{div } \vec{A})_{min} \approx (-0.05 \text{ addition/dpt} - 0.08)$ dpt/mm.

31. Progressive lens as claimed in claim 18, wherein the divergence div $\vec{A}$ of the vectorial astigmatism $\vec{A}$ in the horizontal section at y=−14 mm does not exceed a maximum value of $(\text{div } \vec{A})_{max} \approx (0.12 \text{ addition/dpt} + 0.06)$ dpt/mm.

32. Progressive lens as claimed in claim 18, wherein the divergence div $\vec{A}$ of the vectorial astigmatism $\vec{A}$ in the horizontal section at y=−14 mm does not drop below a minimum value of $(\text{div } \vec{A})_{min} \approx (-0.13 \text{ addition/dpt} - 0.05)$ dpt/mm.

* * * * *